(12) United States Patent
Mochizuki

(10) Patent No.: US 9,358,614 B2
(45) Date of Patent: Jun. 7, 2016

(54) SLURRY RECYCLING METHOD, PRODUCING METHOD OF RARE EARTH SINTERED MAGNET AND SLURRY RECYCLING APPARATUS

(75) Inventor: Mitsuaki Mochizuki, Saitama (JP)

(73) Assignee: HITACHI METALS, LTD., Tokyo (JP)

( * ) Notice: Subject to any disclaimer, the term of this patent is extended or adjusted under 35 U.S.C. 154(b) by 781 days.

(21) Appl. No.: 13/583,967

(22) PCT Filed: Mar. 28, 2011

(86) PCT No.: PCT/JP2011/057540
§ 371 (c)(1),
(2), (4) Date: Sep. 11, 2012

(87) PCT Pub. No.: WO2011/125578
PCT Pub. Date: Oct. 13, 2011

(65) Prior Publication Data
US 2013/0011293 A1    Jan. 10, 2013

(30) Foreign Application Priority Data

Mar. 31, 2010    (JP) .................................. 2010-082041

(51) Int. Cl.
| | |
|---|---|
| *B02C 18/08* | (2006.01) |
| *B22F 9/04* | (2006.01) |
| *B22F 8/00* | (2006.01) |
| *C22C 38/00* | (2006.01) |
| *C22C 38/10* | (2006.01) |
| *H01F 1/08* | (2006.01) |
| *H01F 41/02* | (2006.01) |

(Continued)

(52) U.S. Cl.
CPC . *B22F 9/04* (2013.01); *B02C 18/08* (2013.01); *B22F 8/00* (2013.01); *C22B 7/005* (2013.01);

(Continued)

(58) Field of Classification Search
CPC .................................. B02C 18/08; B02C 23/36
USPC ...................................................... 241/159, 21
See application file for complete search history.

(56) References Cited

U.S. PATENT DOCUMENTS

| | | | | |
|---|---|---|---|---|
| 5,312,052 | A | * | 5/1994 | Dellekamp ................. 241/24.14 |
| 7,159,809 | B1 | * | 1/2007 | Cheng ....................... B02C 4/08 |
| | | | | 241/101.2 |

(Continued)

FOREIGN PATENT DOCUMENTS

| | | |
|---|---|---|
| CN | 86105182 A | 3/1988 |
| CN | 1067826 A | 1/1993 |

(Continued)

OTHER PUBLICATIONS

International Search Report for International Application No. PCT/JP2011/057540 dated Jun. 14, 2011.

(Continued)

*Primary Examiner* — Mark Rosenbaum
(74) *Attorney, Agent, or Firm* — Kratz, Quintos & Hanson, LLP

(57) ABSTRACT

The present invention provides a producing method of a rare earth sintered magnet which is suitable as a producing method of a high performance rare earth sintered magnet which can reduce the number of steps for reusing defective molded bodies generated in a wet molding step of the rare earth sintered magnet, and which has a small content amount of oxygen. The invention also provides a slurry recycling method used for the producing method, and a slurry recycling apparatus. Each of the methods includes a crushing step of crushing, in mineral oil and/or synthetic fluid, a molded body in which slurry formed from alloy powder for a rare earth sintered magnet and mineral oil and/or synthetic fluid is wet molded in magnetic field, and recycling the crushed molded body into slurry.

8 Claims, 18 Drawing Sheets

(51) Int. Cl.
*C22B 7/00* (2006.01)
*H01F 1/055* (2006.01)
*B22F 9/00* (2006.01)
*H01F 1/057* (2006.01)

(52) U.S. Cl.
CPC ............ *C22C 38/002* (2013.01); *C22C 38/005* (2013.01); *C22C 38/10* (2013.01); *H01F 1/0557* (2013.01); *H01F 1/086* (2013.01); *H01F 41/0266* (2013.01); *H01F 41/0273* (2013.01); *B22F 2009/001* (2013.01); *H01F 1/0577* (2013.01); *Y02P 10/24* (2015.11); *Y02W 30/541* (2015.05)

(56) References Cited

U.S. PATENT DOCUMENTS

| | | | |
|---|---|---|---|
| 8,770,503 B2 * | 7/2014 | Weidman et al. | 241/35 |
| 2003/0006327 A1 * | 1/2003 | Ryu | 241/159 |

FOREIGN PATENT DOCUMENTS

| | | |
|---|---|---|
| CN | 101447331 A | 6/2009 |
| JP | H10-97937 | 4/1998 |
| JP | H10-125521 | 5/1998 |
| JP | 2001-287163 A | 10/2001 |
| JP | 2003-51418 A1 | 2/2003 |
| JP | 2004-207578 A1 | 7/2004 |

OTHER PUBLICATIONS

Third Office Action issued on Nov. 4, 2015 to the corresponding Chinese patent application No. 201180016417.1.
First Office Action issued Jun. 30, 2014 by The State Intellectual Property Office of the People's Republic of China in counterpart application No. 201180016417.1.
Office Action dated Sep. 30, 2014 corresponding to Japanese Patent Application No. 2012-509450.
Office action in counterpart Chinese Application No. 201180016417.1, mailed Feb. 16, 2016.

* cited by examiner

SLURRY RECYCLING METHOD, PRODUCING METHOD OF RARE EARTH SINTERED MAGNET AND SLURRY RECYCLING APPARATUS

TECHNICAL FIELD

The present invention relates to a producing method of a rare earth sintered magnet reusing defective molded bodies generated in a step of a wet molding method, a slurry recycling method and a slurry recycling apparatus used in this producing method.

BACKGROUND TECHNIQUE

As a high performance rare earth sintered magnet, two kinds of magnets, i.e., a samarium-cobalt-based sintered magnet and a neodymium-iron-boron-based sintered magnet are widely used.

Especially since the neodymium-iron-boron-based sintered magnet ("R-T-B-based sintered magnet, hereinafter) shows the highest magnetic energy product among various magnets and is inexpensive and thus, this magnet is employed in various kinds of electric equipment.

A rare earth sintered magnet such as the R-T-B-based sintered magnet is produced in a manner that raw material metal is melted, alloy powder formed by roughly pulverizing and finely pulverizing raw material alloy obtained by pouring the raw material metal into a mold or raw material alloy formed by a strip casting method is press-formed and then, the press-formed resultant matter is subjected to a sintering step and a thermally processing step. As the press forming method, there are known two kinds of methods, i.e., a dry molding method in which the pressing and forming operation is carried out using dry alloy powder, and a wet molding method (registered trademark: HILOP, patent document 1, patent document 2) in which alloy powder before molding is put into oil to form slurry, and the molding is carried out using this slurry. In any of the dry molding method and the wet molding method, a molded body becomes chipped or cracked during the molding operation or due to a handling manner after the molding operation, and defective molded bodies are generated. Further, in the case of rare earth metal used for a rare earth sintered magnet, since countries of origin are limited, a supply amount is limited and the rare earth metal is expensive. Hence, to suppress the producing cost of the rare earth sintered magnet, it is absolutely necessary to reuse the defective molded bodies and recycle the same as a product.

Patent document 3 proposes a technique in which a scrap magnet is pulverized, molded and sintered to obtain a recycled magnet, metal atoms such as Dy and Tb are made to adhere to a surface of the recycled magnet, the adhered metal atoms are dispersed to crystal grain boundary and/or crystal grain boundary phase, and a scrap magnet is recycled.

Patent document 4 proposes a method of producing a rare earth sintered magnet by hydrogen-pulverizing, molding and sintering a scrap magnet having a content of oxygen generated in a producing step of a rare earth sintered magnet is 2,000 ppm or lower.

However, the above-described conventional producing methods relate to a method of recycling a sintered body or a molded body produced by the dry molding method, and these methods do not disclose a technique for recycling a molded body molded by the wet molding method.

PRIOR ART DOCUMENTS

Patent Documents

Patent Document 1: Japanese Patent Publication No. 2731337
Patent Document 2: Japanese Patent Publication No. 2859517
Patent Document 3: WO2009/104632A1
Patent Document 4: Japanese Patent Application Laid-open No. 2006-265610

SUMMARY OF THE INVENTION

Problem to be Solved by the Invention

It is an object of the present invention to provide a producing method of a rare earth sintered magnet which is preferable as a producing method of a high performance rare earth sintered magnet capable of reducing a cost by reusing a defective product generated in a producing step of the rare earth sintered magnet and having a small oxygen content, and to provide a slurry recycling method and a slurry recycling apparatus used in the producing method.

Means for Solving the Problem

Concerning defective molded bodies, the inventors of the present invention found the following knowledge (1) to (3). (1) Comparing with a molded body molded by the dry molding method, a defective molded body generated by press molding by the wet molding method is not oxidized so fast even if the defective molded body is left in atmosphere. (2) If a special slurry recycling apparatus is used, slurry can be recycled without changing a particle diameter of alloy powder for a rare earth sintered magnet in the defective molded body. (3) This recycled slurry can be reused as slurry before it is wet molded, or can be reused as mixed slurry which is mixed in slurry (new slurry).

Concerning recycled slurry obtained by crushing wet molded defective molded bodies, the inventors of the present invention also found the following knowledge (4) and (5). (4) Recycled slurry has a low oxygen content. (5) High performance rare earth sintered magnet having a low oxygen content can be produced by sintering a molded body molded by wet molding recycled slurry.

In the present invention, the term "slurry" means suspension in which rare earth sintered powder is suspended into mineral oil and/or synthetic fluid.

The term "defective molded body" means a molded body which is crushed in mineral oil and/or synthetic fluid and is to be recycled into slurry.

The term "recycled slurry" means defective molded body which is crushed and recycled into slurry.

The term "new slurry" means suspension which is newly produced alloy powder for a rare earth sintered magnet from raw material alloy and suspended in mineral oil and/or synthetic fluid.

The term "mixed slurry" means a mixture of recycled slurry and new slurry.

A first aspect of the present invention provides a slurry recycling method including a crushing step of crushing, in mineral oil and/or synthetic fluid, a molded body in which slurry formed from alloy powder for a rare earth sintered magnet and mineral oil and/or synthetic fluid is wet molded in magnetic field, and recycling the crushed molded body into slurry.

According to a second aspect of the invention, in the slurry recycling method of the first aspect, a particle diameter of the alloy powder for a rare earth sintered magnet in the recycled slurry which is recycled by the crushing step is not changed from a particle diameter of the alloy powder for the rare earth sintered magnet before it is recycled by the crushing step.

Here, "the particle diameter is not changed from a particle diameter of the alloy powder for the rare earth sintered magnet before it is recycled by the crushing step" means that when a grain size distribution of the alloy powder for a rare earth sintered magnet in slurry is evaluated based on D50, particle diameters of the magnet properties for a rare earth magnet before and after the crushing step are not changed more than 10% (change ratio of D50 is within ±10%). Here, D50 means a particle diameter which is 50% of the entire volume as integrated from smaller particle diameter. A grain size distribution is measured by particle diameter measuring method (which is pursuant to ISO13320-1) by laser diffractometry. Definition concerning the particle diameter change is also the same in later-described producing method of a rare earth sintered magnet and slurry recycling apparatus.

According to a third aspect of the invention, in the slurry recycling method of the first or second aspect, the crushing step includes a filtering step of removing foreign matters.

A fourth aspect of the invention provides a producing method of a rare earth sintered magnet including a crushing step of crushing, in mineral oil and/or synthetic fluid, a molded body in which slurry formed from alloy powder for a rare earth sintered magnet and mineral oil and/or synthetic fluid is wet molded in magnetic field, and recycling the crushed molded body into slurry; and a recycled slurry sintering step of wet molding, in magnetic field, the recycled slurry which is recycled by the crushing step, and sintering an obtained molded body.

A fifth aspect of the invention provides a producing method of a rare earth sintered magnet including a crushing step of crushing, in mineral oil and/or synthetic fluid, a molded body in which slurry formed from alloy powder for a rare earth sintered magnet and mineral oil and/or synthetic fluid is wet molded in magnetic field, and recycling the crushed molded body into slurry; a mixing step of mixing, with each other, the recycled slurry which is recycled by the crushing step, and slurry including mineral oil and/or synthetic fluid and alloy powder for a rare earth sintered magnet which is obtained by roughly pulverizing and finely pulverizing raw material alloy obtained by melting raw material metal, thereby forming mixture slurry; and a sintering step of wet molding the mixture slurry in magnetic field, and sintering an obtained molded body.

According to a sixth aspect of the invention, in the producing method of a rare earth sintered magnet of the fourth or fifth aspect, a particle diameter of the alloy powder for a rare earth sintered magnet in the recycled slurry which is recycled by the crushing step is not changed from a particle diameter of the alloy powder for the rare earth sintered magnet before it is recycled by the crushing step.

According to a seventh aspect of the invention, in the producing method of a rare earth sintered magnet of any of fourth to sixth aspects further includes a storing step of storing, in the mineral oil and/or synthetic fluid, the molded body before it is recycled into the slurry by the crushing step.

According to an eighth aspect of the invention, in the producing method of a rare earth sintered magnet of the seventh aspect, the storing step is carried out in the mineral oil and/or synthetic fluid accommodated in a storage container, and a space in the storage container which is not filled with the mineral oil and/or synthetic fluid is brought into inert gas atmosphere.

According to a ninth aspect of the invention, in the producing method of a rare earth sintered magnet any of fourth to eighth aspects, the crushing step includes a filtering step of removing foreign matters.

A tenth aspect of the invention provides a slurry recycling apparatus in which a molded body obtained by wet molding, in magnetic field, slurry formed of alloy powder for a rare earth sintered magnet and mineral oil and/or synthetic fluid is crushed in mineral oil and/or synthetic fluid to recycle the molded body into slurry, the slurry recycling apparatus includes a roughly crushing tank including roughly crushing teeth which roughly crush the molded body, and finely crushing tank including finely crushing teeth which finely crush the roughly crushed molded body, and a lower portion of the roughly crushing tank and an upper portion of the finely crushing tank are in communication with each other.

According to an eleventh aspect of the invention, in the slurry recycling apparatus of the tenth aspect, a particle diameter of the alloy powder for a rare earth sintered magnet in the molded body before it is crushed and a particle diameter of the alloy powder for a rare earth sintered magnet in the slurry after it is crushed are the same.

According to a twelfth aspect of the invention, the slurry recycling apparatus of the tenth or eleventh aspect further includes a passage, and the finely crushing tank and a portion in the roughly crushing tank which is higher than the roughly crushing teeth are in communication with each other through the passage.

According to a thirteenth aspect of the invention, the slurry recycling apparatus of any one of the tenth to twelfth aspects further includes a filter portion which is in communication with the finely crushing tank.

According to a fourteenth aspect of the invention, the slurry recycling apparatus of the twelfth aspect further includes a filter portion provided in a halfway portion in the passage.

According to a fifteenth aspect of the invention, in the slurry recycling apparatus of the thirteenth or fourteenth aspect, the filter portion includes a cylindrical filter in which annular plates are laminated on each other such that a gap is formed between opposed surfaces of the annular plates.

According to a sixteenth aspect of the invention, in the slurry recycling apparatus of the thirteenth or fourteenth aspect, the filter portion includes a first filter and a second filter, and fine foreign matters which pass through the first filter are removed by the second filter.

According to a seventeenth aspect of the invention, in the slurry recycling apparatus of the sixteenth aspect, the first filter is a plate-like punching metal in which a plurality of holes are formed, and the second filter is a cylindrical filter in which annular plates are laminated on each other such that a gap is formed between opposed surfaces of the annular plates.

According to an eighteenth aspect of the invention, the slurry recycling apparatus of the tenth aspect further includes a conduit, and an upper portion of the roughly crushing teeth in the roughly crushing tank and an upper portion of the roughly crushing tank are in communication with each other through the conduit.

According to a nineteenth aspect of the invention, in the slurry recycling apparatus of the seventeenth aspect, a peripheral wall of the conduit is formed from a punching metal in which a plurality of holes are formed.

Effect of the Invention

According to the slurry recycling method of the present invention, it is unnecessary to carryout the step (step of further reducing particle diameter of fine powder constituting molded body) of pulverizing defective molded bodies generated in a pressing step of the wet molding method before the crushing step. Hence, a cost required for recycling defective molded bodies can be lowered as compared with the conventional technique.

When defective molded bodies are made into recycled slurry by the crushing step, it is possible to employ a configuration that a particle diameter of alloy powder for a rare earth sintered magnet in the defective molded bodies is not changed. According to this configuration, changes of magnet properties and size of a rare earth sintered magnet which are caused by variation in particle diameter are not generated. Further, a problem caused when the pulverizing step in which high energy changing a particle diameter is applied to alloy powder for a rare earth sintered magnet is carried out is not generated. That is, according to the invention, a problem (so-called contamination) in which powder or a flake of metal balls or ceramic balls (media) used when a molded body is pulverized by an attritor or a ball mill is mixed in recycled slurry is not generated. Further, defective molded bodies used as a raw material of the recycled slurry are formed by the wet molding method, and an oxygen content is low. Hence, the defective molded bodies are suitable for slurry for a high performance rare earth sintered magnet having a low oxygen content.

The crushing step may includes a filtering step of removing foreign matters. By the filtering step, foreign matters can be removed and non-pulverized defective molded bodies can be distinguished. Therefore, it is possible to efficiently recycle only slurry crushed into particle diameter of alloy powder for rare earth sintered magnet before recycle (only slurry whose particle diameter of alloy powder for rare earth sintered magnet before recycle is not changed). The term "non-crushed defective molded bodies" means defective molded bodies which are not crushed to particle diameter of alloy powder for a rare earth sintered magnet before recycle.

According to the producing method of a rare earth sintered magnet of the present invention, it is possible to reduce a cost required for a recycling operation of defective molded bodies as compared with the conventional technique due to the same reason as that of the slurry recycling method of the invention. Magnet properties and size of a rare earth sintered magnet caused by variation in particle diameter are not changed, and contamination is not generated.

The method may include a storing step of storing a molded body before it is recycled into slurry by the crushing step in mineral oil and/or synthetic fluid. According to this configuration, it is possible to prevent defective molded bodies used as raw material of recycled slurry from being oxidized by oxygen or water in atmosphere while they are stored. In this case, if the storing step is carried out in a storage container which is brought into inert gas atmosphere, it is possible to prevent oxygen in atmosphere from melting into mineral oil and/or synthetic fluid. According to this configuration, it is possible to prevent oxidization of defective molded bodies caused by influence of dissolved oxygen from proceeding in the storing step.

The crushing step may include a filtering step of removing foreign matters. By removing foreign matters from recycled slurry made of defective molded bodies as raw material, when recycled slurry or mixture slurry including recycled slurry is wet molded and an obtained molded body is sintered into a rare earth sintered magnet, it is possible to prevent an abnormal portion from generating in the rare earth sintered magnet. The filtering step is also suitable for controlling a particle diameter of recycled slurry, and this step can effectively be carried out by passing slurry through a cylindrical filter. The abnormal portion is a so-called pin hole caused by foreign matters in a rare earth sintered magnet.

According to the slurry recycling apparatus of the invention, a molded body can roughly be crushed by the roughly crushing teeth of the roughly crushing tank, and the molded body can be sent to the finely crushing tank which is in communication with a lower portion thereof. The molded body sent to the finely crushing tank is roughly crushed already. Hence, it is possible to prevent the finely crushing efficiency from lowering by a fact that the molded body covers finely crushing teeth.

A molded body which is sent to the finely crushing tank is further crushed by the finely crushing teeth, and is dispersed into recycled slurry. As a result, a particle diameter of alloy powder for a rare earth sintered magnet in slurry is not changed before and after the crushing operation.

It is possible to employ a configuration that a passage is provided and the finely crushing tank and the roughly crushing tank are in communication with each through the passage. According to this configuration, a flow into a passage toward a side of finely crushing tank is formed by rotating the finely crushing teeth, and a crushed defective molded bodies or recycled slurry can be supplied from the finely crushing tank to the roughly crushing tank. According to this, recycled slurry and crushed defective molded bodies can be circulated between the finely crushing tank and the roughly crushing tank. The recycled slurry and the roughly crushed defective molded bodies circulate between the roughly crushing tank and the finely crushing tank, and they are crushed by the roughly crushing teeth and the finely crushing teeth. By this crushing operation, the defective molded bodies are made to flow by the circulation and collide against an inner wall of the crushing tank or the finely crushing tank. By this collision also, the crushing phenomenon of the defective molded bodies proceeds.

The slurry recycling apparatus may includes a filter portion which is in communication with the finely crushing tank. According to this configuration, the filter portion can remove foreign matters, and can control a particle diameter of recycled slurry. The filter portion can be provided in a passage through which the finely crushing tank and a portion of the roughly crushing tank which is higher than the roughly crushing teeth are brought into communication with each other. It is preferable that the filter portion is a cylindrical filter in which annular plates are laminated on each other such that a gap is formed between opposed surfaces thereof. If the cylindrical filter is used, a flow flowing along an inner wall can be formed. By this flow, only the alloy powder for a rare earth sintered magnet in the recycled slurry and mineral oil and/or synthetic fluid are made to pass through a gap by a centrifugal force, and foreign matters can efficiently be removed. At this time, non-crushed defective molded bodies which are not crushed to a particle diameter of alloy powder for a rare earth sintered magnet before recycle can be distinguished. Therefore, it is possible to efficiently recycle slurry including slurry crushed to a particle diameter of alloy powder for a rare earth sintered magnet before recycle, i.e., slurry only including alloy powder for a rare earth sintered magnet having a particle diameter which is not changed as compared with that before recycle.

Foreign matters may be removed by two filters, i.e., a first filter and a second filter. According to this configuration, it is possible to remove relatively large foreign matters by the first filter, and to remove small foreign matters by the second filter.

Hence, it is possible to prevent the second filter from being damaged by large foreign matters, and the filtering efficiency is enhanced.

As a combination of the first filter and the second filter, it is possible to preferably use a combination of a punching metal and a cylindrical filter. The punching metal means a plate-like metal in which a plurality of holes are formed. The cylindrical filter is a filter formed by laminating annular plates such that a gap is formed between opposed surfaces thereof.

If there is provided a conduit through which an upper portion of the roughly crushing teeth in the roughly crushing tank and an upper portion of the roughly crushing tank are in communication with each other, the conduit above the roughly crushing teeth becomes a passage. Recycled slurry of more than a given amount can be supplied to the roughly crushing teeth through this passage. By this supply, it is possible to prevent defective molded bodies in the roughly crushing tank from being sucked toward the finely crushing tank at a stroke at the time of circulation. Therefore, it is possible to suppress deterioration in efficiency caused by defective molded bodies covering the finely crushing teeth. As the conduit, it is possible to use a conduit made of punching metal in which a plurality of holes are formed in its peripheral wall.

Further, since it is possible to reuse defective molded bodies including hard-to-find rare earth metal, it is possible to contribute to natural resources saving to prevent depletion of resources.

MODE FOR CARRYING OUT THE INVENTION

First Embodiment

An embodiment of a slurry recycling method according to the present invention will be described below.

Figure 1:
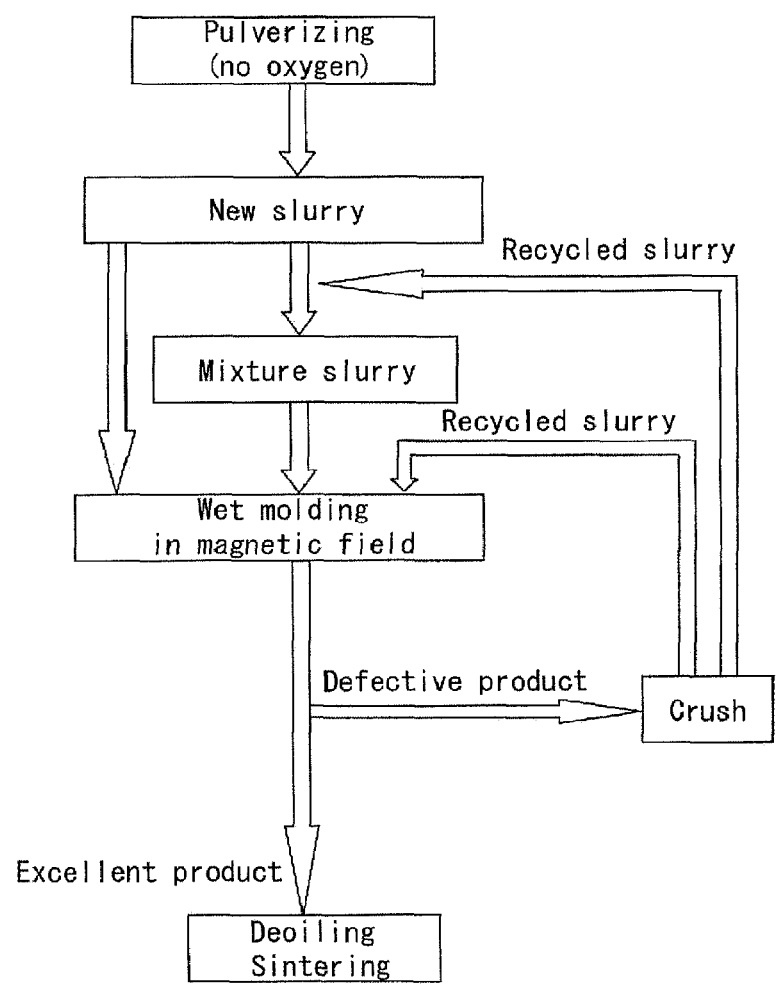
FIG. 1 is a process chart for explaining steps in first and second embodiments of the present invention.

FIG. 1 is a process chart for explaining steps of the slurry recycling method of the embodiment. FIG. 1 also shows steps of a producing method of a rare earth sintered magnet which will be described later as a second embodiment. As shown in FIG. 1, according to the slurry recycling method of the embodiment, recycled slurry crushed in oil is formed such that a particle diameter thereof is not changed without pulverizing alloy powder for a rare earth sintered magnet in defective molded bodies. Here, the "defective molded bodies" are generated in a step of wet molding slurry in magnetic field into a molded body (wet molding-in magnetic field step, and this step is called "wet molding step", hereinafter) in production of rare earth sintered magnet.

The slurry is formed of alloy powder for a rare earth sintered magnet ("alloy powder" hereinafter) and mineral oil and/or synthetic fluid ("oil", hereinafter).

This recycled slurry is wet molded as mixture slurry by adding this recycled slurry to new slurry formed of alloy powder and oil, and an obtained molded body is sintered. According to this, it is possible to reuse, in a wet molding step, defective molded bodies generated in the wet molding step.

By wet molding slurry using only recycled slurry, and by sintering the obtained molded body, a rare earth sintered magnet can be produced.

In the invention, the term "crushing" is to recycle defective molded bodies into slurry such that particle diameter thereof is not changed without pulverizing the alloy powder for a rare earth sintered magnet in the defective molded bodies.

With respect to the term "crushing", "pulverizing" means to reduce a particle diameter of alloy powder for a rare earth sintered magnet when it is recycled as slurry.

In the invention, a molded body is crushed in mineral oil and/or synthetic fluid and recycled as slurry. A molded body which is to be crushed and recycled means a molded body which can not be subjected to a next sintering step. More specifically, the molded body means a broken, chipped or cracked molded body or a molded body having a problem in shape (thickness differs depending upon locations), in concentration or in weight caused at the time of a molding operation or by a handling process after the molding operation. These molded bodies are called "defective molded bodies" generally.

Not only the defective molded body, but also an excellent molded body which is not defective can be crushed and recycled in some cases. Specific examples of such cases are a case where a hard-to specify defective portion is mixed into an "excellent product" and a problem occurs if it is subjected to the sintering step as it is, and a case where an excellent product must be discarded due to a contingent accident or trouble.

If molded bodies including not only a molded body generally called "defective product" but also a molded body generally called "excellent product" must be molded as the recycled slurry, they are called "defective molded bodies".

(Alloy Powder for Rare Earth Sintered Magnet)

It is preferable that alloy powder for a rare earth sintered magnet is raw material alloy for an R-T-B-based sintered magnet, and preferably an R—Fe (Co) -B-M-based alloy.

Here, R is selected from at least one kind of Nd, Pr, Dy and Tb. It is preferable that R includes at least one kind of Nd and Pr. More preferably, a combination of rare earth elements represented by Nd—Dy, Nd—Tb, Nd—Pr—Dy or Nd—Pr—Tb is used. Here, Dy and Tb among R exert an enhancing effect of a coercive force.

Alloy powder for a rare earth sintered magnet may contain other rare earth elements such as a small amount of Ce and La other than the above-described elements, and it is possible to use mischmetal (alloy including a plurality of rare earth elements) and didym (didymium, alloy including Nd and Pr as main ingredients). Further, R may not be a pure element and may contain impurities which are unavoidable in terms of a manufacturing nature within an industrially available range. A conventionally known content can be employed, and a preferable range of the content is 25% by mass or more and 35% by mass or less. If the content is less than 25% by mass, high magnet properties, especially high coercive force can not be obtained, and if the content exceeds 35% by mass, a residual magnetic flux density is lowered.

Here, T absolutely includes Fe, and 50% by mass thereof can be replaced by Co. Here, Co is effective for enhancing temperature characteristics and corrosion resistance, and a combination of 10% by mass Co and a balance of Fe is normally used. A content of T occupies balance of R and B, or R, B and M.

A known content may be employed for B, and a preferable range of the content of B is between 0.9% by mass and 1.2% by mass. If the content is less than 0.9% by mass, a high coercive force can not be obtained, and if the content exceeds 1.2% by mass, a residual magnetic flux density is lowered and it is not preferable. A portion of B can be replaced by C. By the replacement of C, it is possible to enhance a corrosion resistance of a magnet and this is effective. A content when B and C are used, it is preferable that the number of atoms of C replacement is converted by the number of atoms of B, and the content is set within a range of B concentration.

In addition to the above-described elements, M element can be added to enhance the coercive force. The M element is at least one kind of Al, Si, Ti, V, Cr, Mn, Ni, Cu, Zn, Ga, Zr, Nb, Mo, In, Sn, Hf, Ta and W. The additive amount is preferably 2% by mass or less. If the additive amount exceeds 5% by mass, the residual magnetic flux density is lowered.

Unavoidable impurities can be permitted. Examples of such impurities are Mn and Cr which are mixed from Fe, and Al, Si and Cu which are mixed from Fe—B (ferroboron).

(Storing Step of Defective Molded Bodies)

As shown in FIG. 1, in this embodiment, a wet molded defective molded bodies are molded into recycled slurry. In the case of the wet molded defective molded bodies, even if they are left in atmosphere for a while in a producing step of a rare earth sintered magnet, oxidization does not proceed abruptly unlike a dry molded body. Hence, the wet molded defective molded bodies can be used as recycled slurry. It is considered this is because if defective molded bodies are left in atmosphere, although oil on a surface of alloy powder is evaporated, an oil film which is sufficient for preventing contact with oxygen and moisture in atmosphere is still formed on the surface of the molded body. Recycled slurry is added to new slurry or used as it is.

Figure 2:
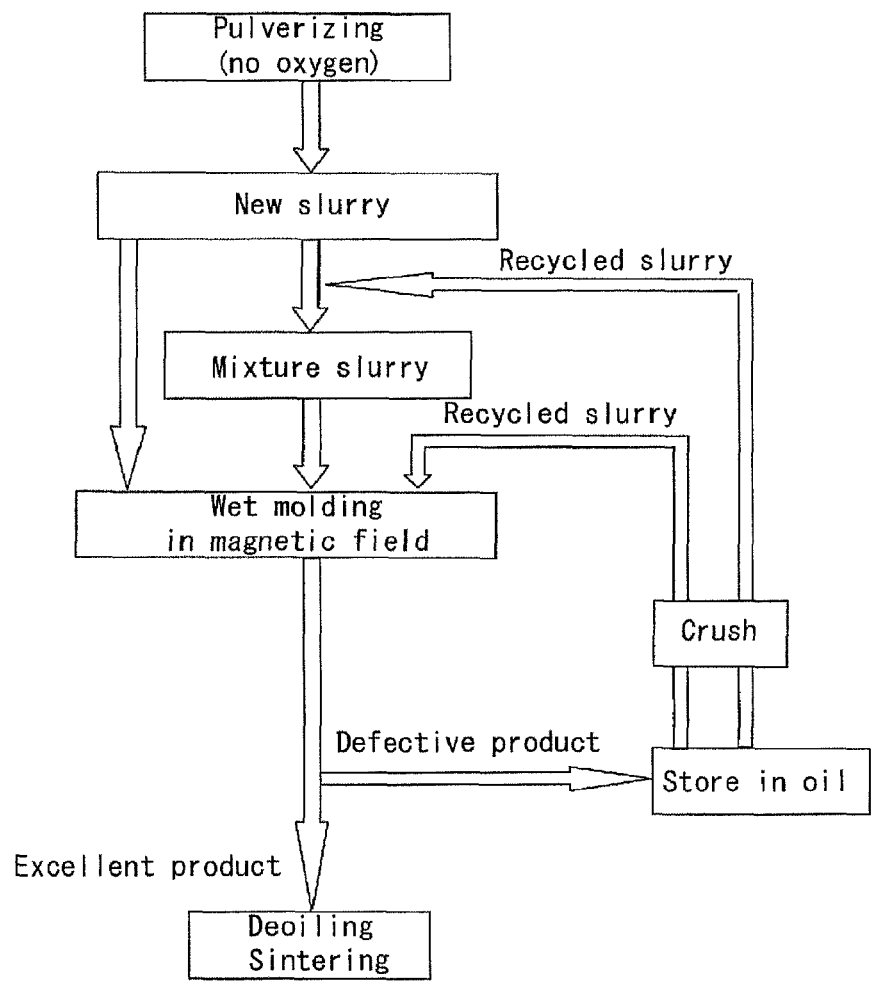
FIG. 2 is a process chart for explaining storing methods of defective molded bodies in the first and second embodiments of the invention.

However, if the defective molded bodies are left in atmosphere for a long time, oxidization of the defective molded bodies proceeds gradually. Therefore, it is preferable that the defective molded bodies are stored in oil as shown in FIG. 2. If the defective molded bodies are stored in oil, even if they are stored for a long time, they react with oxygen and water in atmosphere, and it is possible to prevent the oxidization of the defective molded bodies from proceeding.

If the defective molded bodies are stored in oil, it is possible to prevent oxidization caused by reaction with oxygen and water in atmosphere as described above. However, in the case of defective molded bodies stored in oil, oxidization gradually proceeds due to dissolved oxygen contained in oil. This oxidization is caused by reaction of the defective molded bodies with dissolved oxygen in oil.

Concentration of dissolved oxygen in oil is lowered by reaction between dissolved oxygen and defective molded bodies. However, if the oil is in contact with atmosphere, oxygen in the atmosphere is dissolved in oil, and the concentration of dissolved oxygen in the oil is increased. That is, if the oil is in contact with atmosphere, oxygen in the atmosphere is always supplied to the molded body through oil. As a result, oxidization of the defective molded bodies gradually proceeds.

Hence, to cut off the supply of oxygen to the defective molded bodies, it is preferable to prevent oil in which defective molded bodies are stored from coming into contact with oxygen and water. More specifically, the defective molded bodies are immersed in oil accommodated in a storage container, and a space in the storage container which is not filled with oil is brought into inert gas atmosphere (nitrogen, argon etc). As the inert gas, nitrogen is preferably used in terms of economy. An influence of dissolved oxygen initially included in oil exerted on oxidization of defective molded bodies is not great. Hence, if the supply of oxygen carried out by inert gas is cut off, oxidization of stored defective molded bodies can sufficiently be suppressed.

The slurry recycling method and the producing method of a rare earth sintered magnet are preferably used for producing a high performance rare earth sintered magnet having a low oxygen concentration. Hence, it is effective to cut off a possible supply source of oxygen as low as possible. By cutting off the oxygen, the oxygen content of an obtained rare earth sintered magnet can be lowered, and a high performance rare earth sintered magnet can be obtained.

(Crushing Step)

Figure 3:
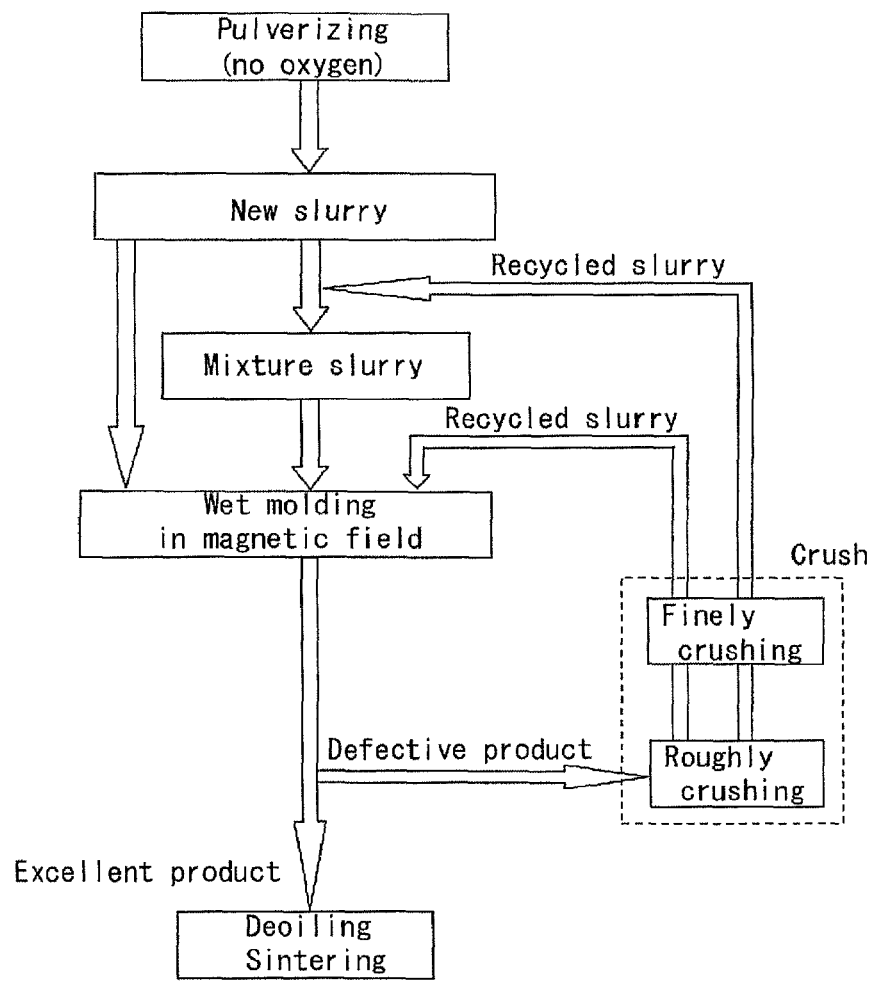
FIG. 3 is a process chart for explaining a crushing operation of the defective molded bodies in the first and second embodiments of the invention.

A crushing step of crushing defective molded bodies to obtain recycled slurry can be carried out in one stage as shown in FIG. 1. However, in terms of operation efficiency, it is preferable that the crushing step is carried out in two stages, i.e., a roughly crushing step and a finely crushing step as shown in FIG. 3.

Sizes of defective molded bodies vary. Hence, in the crushing step, defective molded bodies which are greater than a rotation radius of finely crushing teeth used for crushing finely are crushed in some cases. The crushing operation of a molded body carried out by the finely crushing teeth proceeds not only in a manner that the finely crushing teeth rub directly against molded bodies but also in a manner that molded bodies is sandwiched between the finely crushing teeth and an inner wall of the finely crushing tank. Hence, if the crushing operation of defective molded bodies is carried out in one stage, defective molded bodies which are greater than a radius of the finely crushing teeth can not enter between the finely crushing teeth for crushing and the inner wall of the finely crushing portion. As a result, the finely crushing teeth can not crush defective molded bodies existing on an upper side thereof and the finely crushing teeth only idle. Hence, it becomes difficult to crush defective molded bodies and the crushing efficiency is deteriorated.

Hence, a roughly crushing step of cutting defective molded bodies into a size suitable of the crushing operation is provided before the finely crushing step so that deterioration of the operation efficiency can be prevented.

On the other hand, a small defective molded bodies which pass between the roughly crushing tank for crushing are crushed in some cases. In such a case, only a crushing operation using the finely crushing teeth is sufficient. That is, the roughly crushing teeth are not rotated, and defective molded bodies may be crushed only by rotation of the finely crushing teeth.

It is possible to select whether the crushing operation of only the finely crushing step should be carried out or the crushing operation of two stages including the roughly crushing step should be carried out and the finely crushing step in accordance with sizes and shapes of defective molded bodies.

The crushing operation carried out using only the finely crushing step and the crushing operation carried out in two stages of the roughly crushing step and the finely crushing step are collectively called a crushing operation or a crushing step.

The crushing step is carried out in oil. Here, the term "in oil" includes a state where defective molded bodies are completely immersed in oil and a state where defective molded bodies are covered with oil film which is sufficient to prevent contact between surfaces of the defective molded bodies and oxygen in atmosphere.

(Filtering Step)

Figure 6:
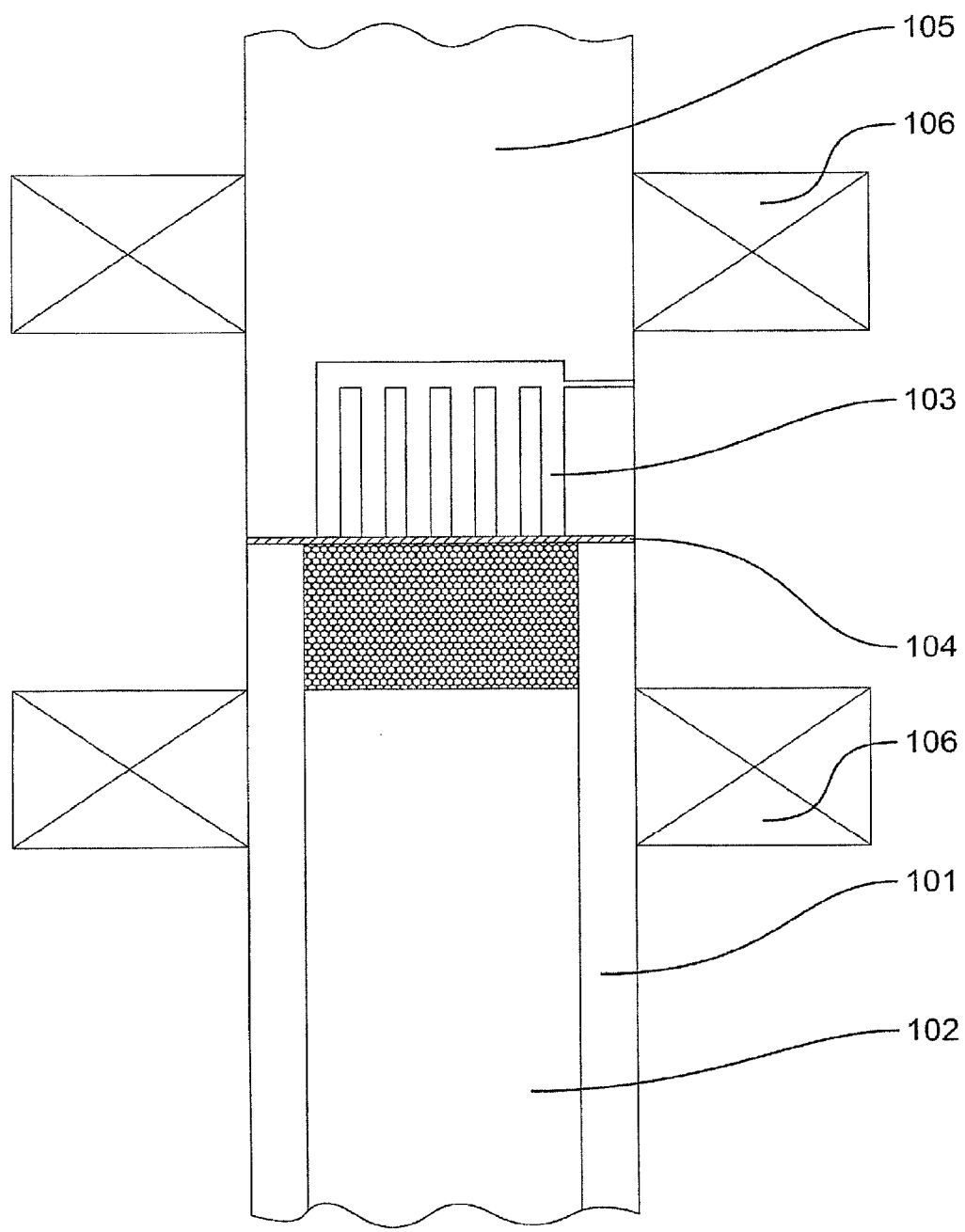
FIG. 6 is a front view showing one example of a press apparatus used for a wet molding operation in the second embodiment of the invention.

In the slurry recycling method and the producing method of a rare earth sintered magnet according to the embodiment, wet molded defective molded bodies are used as recycled slurry. As shown in FIG. 6, according to the wet molding, slurry is compressed and molded by an upper punch 105 and a lower punch 102 in a mold cavity 101. At this time, oil is removed through a filter cloth 104 disposed on the upper punch 105. At this time, fine foreign matters such as fiber adhere to a molded body in some cases.

In this embodiment, defective molded bodies are used as raw material of the recycled slurry. Since defective molded bodies do not become a rare earth sintered magnet through a sintering step as it is, the defective molded bodies are not stored under strict management unlike an excellent product in many cases. Hence foreign matters such as metal are mixed into the defective molded bodies during a storing process and a collecting process in some cases.

Hence, the slurry recycling method and the producing method of a rare earth sintered magnet of the embodiment include a step of removing foreign matters from recycled slurry. By this step, it is possible to prevent a case where a pin hole is formed by foreign matters included in recycled slurry, and to prevent defective products from being generated.

In the step of removing foreign matters from recycled slurry, it is possible to efficiently remove foreign matters from the recycled slurry using the following filter.

This embodiment uses a cylindrical filter formed from annular plates which are laminated on one another to form a gap between opposed surfaces thereof. The recycled slurry in the cylindrical filter is discharged out through the gap between the annular plates to remove the foreign matters from the recycled slurry. More specifically, when foreign matters are removed, a flow of the recycled slurry moving along the inner wall is formed in the cylindrical filter. Only alloy powder and oil are made to pass through the cylindrical filter by a centrifugal force generated by this flow, and the recycled slurry can be discharged out.

When foreign matters are removed from the recycled slurry, a flow recycled slurry moving along the inner wall of the cylindrical filter is formed. By this flow, foreign matters in the cylindrical filter move on the filter inner surface. Therefore, it is possible to restrain foreign matters from depositing on the inner wall of the cylindrical filter, and the operation can be carried out efficiently. At this time, foreign matters are captured by the gap between the annular plates.

Figure 4:
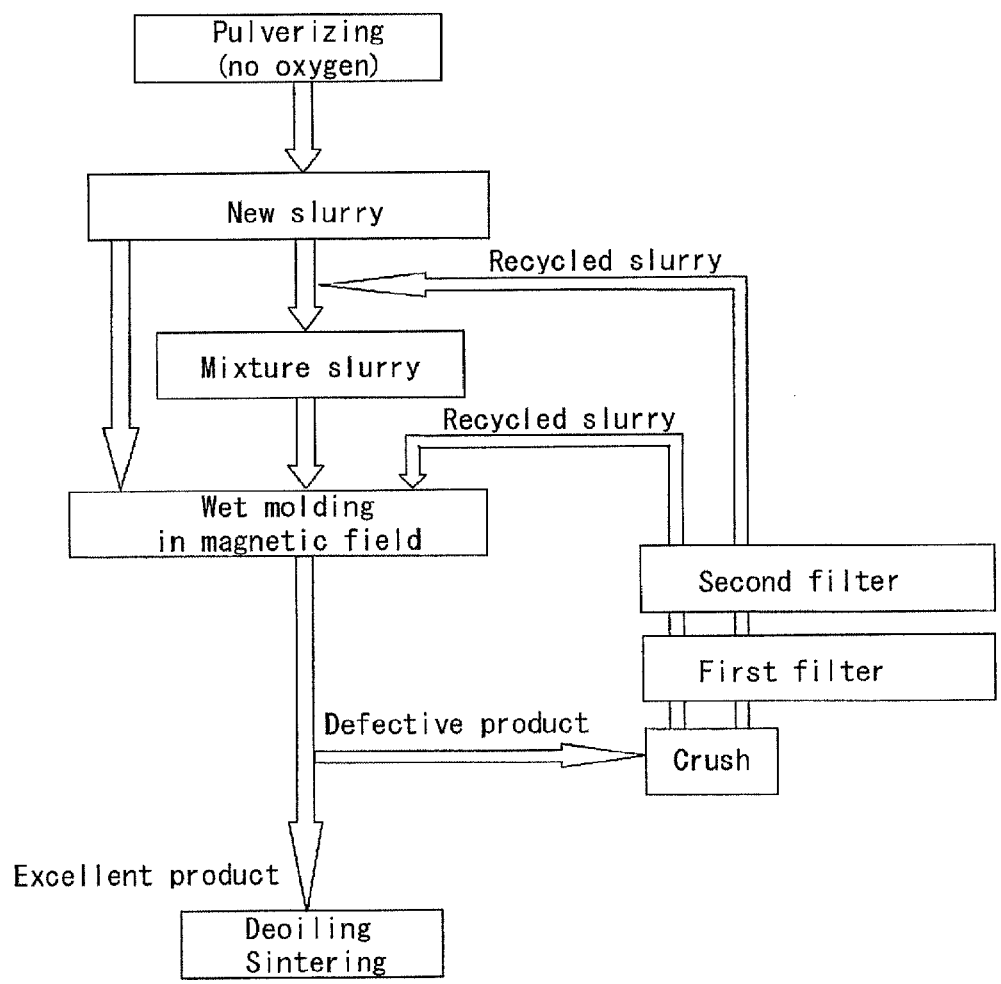
FIG. 4 is a process chart for explaining filtering methods of recycled slurry in the first and second embodiments of the invention.

As the filtering step, it is also possible to employ a configuration in which recycled slurry is made to pass through a first filter and then to pass through a second filter as shown in FIG. 4. More specifically, relatively large foreign matters are removed by the first filter, and fine foreign matters which pass through the first filter are removed by the second filter. If the two kinds of filters are used in this manner, as compared with a case where foreign matters are removed using one filter, it is possible to suppress a case where foreign matters deposit on the filter and the filter is clogged and the operation efficiency is deteriorated. Further, since relatively large foreign matters are removed by the first filter, it is possible to prevent the second filter from being damaged.

It is preferable to use the cylindrical filter as the second filter.

As shown in FIG. 1, the slurry recycling method of the embodiment is for crushing wet molded defective molded bodies to form recycled slurry (crushing step), mixing the recycled slurry with new slurry to form mixture slurry (mixing step), then sintering a molded body which is obtained by wet type forming the mixture slurry in magnetic field (sintering step), or sintering a molded body obtained by wet molding only recycled slurry in magnetic field (recycled slurry sintering step).

Figure 5:
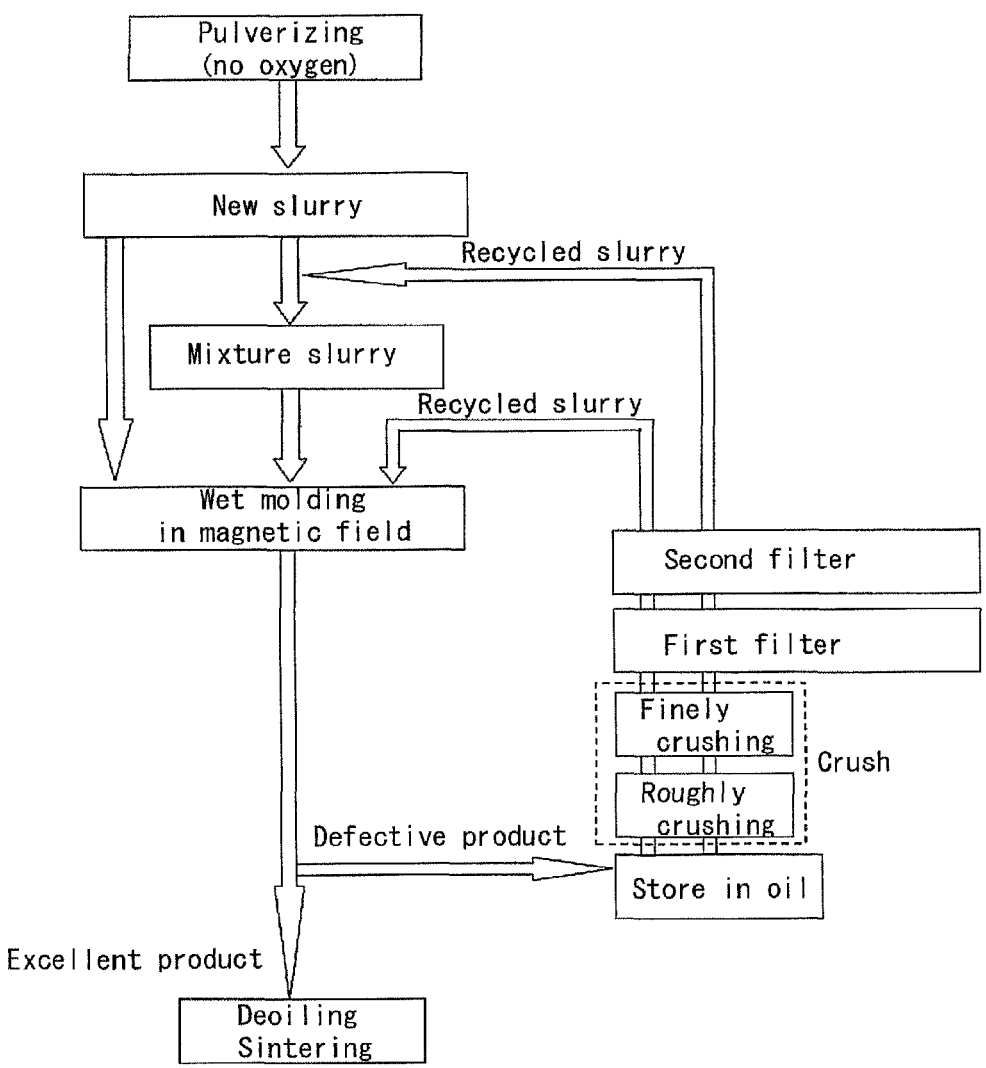
FIG. 5 is a process chart for explaining the most preferable producing method of recycled slurry in the first and second embodiments of the invention.

The slurry recycling method of the embodiment can be carried out by combining preferable steps shown in FIGS. 2 to 4. More preferably, as shown in FIG. 5, the recycling method includes the steps of storing defective molded bodies in oil (storing step), roughly crushing this defective molded bodies and then finely crushing the same, removing relatively large foreign matters by the first filter, and removing, by the second filter, fine foreign matters which pass though the first filter to form recycled slurry (filtering step).

The recycling method may be carried out as a configuration in which the obtained recycled slurry is mixed into new slurry as mixture slurry (mixing step), and it is used as mixture slurry.

Second Embodiment

According to a producing method of a rare earth sintered magnet of the invention, recycled slurry recycled by the slurry recycling method of the invention, or mixture slurry formed by mixing new slurry and recycled slurry is wet molded in magnetic field, and the obtained molded body is sintered. Explanation of the same steps as those of the slurry recycling method described in the first embodiment will be omitted. FIG. 1 is a process chart for explaining steps of the producing method of a rare earth sintered magnet. As shown FIG. 1, according to the producing method of a rare earth sintered magnet of the embodiment, (1) alloy powder for a rare earth sintered magnet in defective molded bodies is crushed in oil by a crushing step without pulverizing the alloy powder such that its particle diameter is not changed, thereby forming recycled slurry, (2) this recycled slurry is added to new slurry which is formed from alloy powder and oil and this is wet molded as mixture slurry, and the obtained molded body is sintered by the sintering step, thereby producing a rare earth sintered magnet. The defective molded bodies generated in the wet molding step can be reused in the wet molding step by the crushing step and the sintering step. The wet molding step means a step of wet molding slurry formed of alloy powder for a rare earth sintered magnet and mineral oil and/or synthetic fluid in magnetic field to mold molded body.

It is also possible to produce a rare earth sintered magnet using recycled slurry only. Hence, only recycled slurry may be wet molded instead of the mixture slurry in the sintering step, and the obtained molded body may be sintered in the recycled slurry sintering step.

(New Slurry Producing Step)

To produce slurry formed of alloy powder and oil, any of the dry type pulverizing and the wet type pulverizing may be used. In the case of the dry type pulverizing using a jet mill, it is preferable that roughly pulverized power of raw material alloy for a rare earth sintered magnet is finely pulverized and immediately after that, it is immersed in oil in inert atmosphere or reducing atmosphere to form slurry. In the case of wet type pulverizing using a ball mill or an attritor, roughly pulverized powder before pulverizing is mixed with oil and in this state, it is pulverized. By these methods, it is possible to cut off the alloy powder which is fine powder from atmosphere, and to prevent the alloy powder from being oxidized, and to prevent moisture from being adsorbed.

The ball mill and the attritor used for the wet type pulverizing use metal balls or ceramic balls as media. Hence, there is fear that powder and chips of the media are mixed into slurry at the time of pulverizing operation (so-called contamination). Therefore, it is more preferable that slurry is formed by immersing the same in oil after the dry type pulverizing operation.

Mineral oil and/or synthetic fluid is preferable as oil to be used, and a fractional distillation point is preferably 350° or lower. Kinematic viscosity under a room temperature condition is preferably 10 cSt or lower, and more preferably, 5 cSt or lower.

(Wet Molding Step)

FIG. 6 shows one example of a press machine which is suitable for wet molding slurry. An example of the wet molding operation using the press machine shown in FIG. 6 will be described below.

The mold 101 is disposed in an orientation magnetic field which can be interrupted. Slurry is charged into a cavity of the mold 101, and orientation magnetic field is applied to the slurry. The alloy powder is oriented by the orientation magnetic field. Then, the upper punch 105 is lowered and a pressure is applied to the mold 101. According to this, oil included in the slurry passes through the molding filter cloth 104 disposed on the upper punch 105, and is discharged through solvent discharging holes 103 formed in the upper punch 105. The alloy powder is compressed in this manner and is molded as a molded body.

While the slurry is compressed, it is preferable that a state where the orientation magnetic field is applied to the slurry is maintained until the compressing operation is completed. This is because that the orientation magnetic field is effective for maintaining orientation of alloy powder and for preventing alloy powder from blowing out. Here, the term blowing out means that alloy powder blows out together with oil from a clearance between the mold 101, the upper punch 105 and the lower punch 102.

FIG. 6 shows a case where a direction of the orientation magnetic field is parallel to a compressing direction. A generating mechanism of the orientation magnetic field, i.e., an orientation magnetic field coil 106 may be provided such that a direction of the orientation magnetic field is perpendicular to the compressing direction. A generating method of the orientation magnetic field is not limited to them. It is preferable that slurry is charged into the cavity of the mold 101 while applying pressure. This is because that if the charging operation is carried out under pressure, it is possible to enhance the residual magnetic flux density ($B_r$) and maximum energy product ($(BH)_{max}$).

If the obtained molded body is left in atmosphere, as oil is evaporated, a surface thereof is dried. As the surface is dried, a portion of the molded body which is not moistened with oil is generated, and the molded body is gradually oxidized from this portion. This oxidization deteriorates characteristics of the rare earth sintered magnet obtained by sintering. To prevent this, it is preferable that the molded body is stored in oil, in gas of non-oxidizing atmosphere or in gas of reducing atmosphere from time immediately after the molding operation until a next step, i.e., the sintering step is carried out.

(Sintering Step)

Next, the sintering step of sintering a molded body is carried out. In this sintering step, if a temperature is abruptly increased from ordinary temperature to 950 to 1,150° C. which is sintering temperature, there is fear that the temperature in the molded body abruptly rises, and oil remaining in the molded body and rare earth elements react with each other. By this reaction, rare earth carbide is produced, generation of sufficient amount of liquid phase for sintering is hindered, a sintered body of sufficient concentration can not be obtained, and there is fear that the magnet properties are deteriorated.

To prevent deterioration of the magnet properties, it is preferable to carry out a deoiling processing to hold the molded body for more than 30 minutes at the temperature of 100 to 500° C. under pressure of $10^{-1}$ Torr or lower. By this deoiling processing, it is possible to sufficiently remove oil remaining in the molded body. The deoiling processing temperature may be kept constant or may be changed if the temperature is in a range of 100 to 500° C. Further, the deoiling processing may be carried out under condition that pressure is $10^{-1}$ Torr or lower, temperature rising speed from room temperature to 500° C. is 10° C./min or less and preferably 5° C./rain. By this processing under this condition, it is possible to obtain the same effect as that of processing carried out under condition that temperature is 100 to 500° C., pressure is $10^{-1}$ Torr or lower and this condition is held for 30 minutes or longer.

(Mixture Slurry)

In the embodiment, in mixture slurry which is wet molded, recycled slurry obtained by crushing defective molded bodies in mineral oil and/or synthetic fluid is included. Here, the term "slurry" means mixture of solid particle and liquid, and means fluid in which solid particle is suspended in liquid. Slurry in the embodiment is mixture in which alloy powder that is solid particle is suspended in oil that is liquid. The present inventors found that if defective molded bodies generated in the wet molding step were crushed using a later-described slurry recycling apparatus, recycled slurry was obtained in a state where alloy powder in the defective molded bodies maintained its original particle diameter.

The defective molded bodies are added to wet molded new slurry as recycled slurry, and is reused. Hence, it is possible to reuse the defective molded bodies at a cost lower than the conventional technique. It is possible to prevent so-called "contamination" which becomes a problem when defective molded bodies are pulverized using a wet type pulverizing apparatus such as the ball mill and the attritor. In the embodiment, the term "contamination" means recycled slurry into which flakes of metal balls and ceramic balls are mixed.

If the conventional method is used, when defective molded bodies are pulverized using a wet type pulverizing apparatus, great energy is applied to alloy powder. If great energy is applied during the pulverizing process, particle diameter of the alloy powder becomes smaller than that before it is pulverized. According to this, particle diameter of alloy powder in the recycled slurry becomes different from particle diameter of alloy powder in new slurry which is not recycled product. If the particle diameter is changed, it is not preferable because magnet properties and size of the obtained sintered magnet are changed.

Thereupon, in the producing method of slurry and the producing method of a rare earth sintered magnet of the embodiment, the slurry recycling apparatus is used without using the pulverizing apparatus. The slurry recycling apparatus crushes defective molded bodies using energy smaller than that of the wet type pulverizing apparatus. Hence, great energy changing particle diameter is not applied to the alloy powder unlike the conventional pulverizing step. Therefore, alloy powder in the recycled slurry has substantially the same particle diameter as that before it is wet molded. Hence, alloy powder in the recycled slurry does not have different properties in terms of particle diameter with respect to alloy powder of new slurry.

(Mixing Step)

In the mixing step, a rate of recycled slurry mixed into new slurry should appropriately be selected in accordance with a content of oxygen of recycled slurry and a content of oxygen required for a rare earth sintered magnet to be produced. Hence, a molded body may be molded only from recycled slurry without carrying out the mixing step. For example, if the content of oxygen of recycled slurry is equal to or lower than a content of oxygen permitted to new slurry, the mixing rate of recycled slurry may be 100%.

In the case of the defective molded body in the wet molding step, a surface of alloy powder is thinly covered with oil. Hence, even if the defective molded bodies are left in atmosphere, oxidization does not abruptly proceed unlike the dry type molded body. Since oxidization does not proceed, a content of oxygen of the defective molded bodies is maintained at a low level, and a content of oxygen of the recycled slurry obtained from the defective molded bodies is also low. Therefore, influence of usage of recycled slurry exerted on a content of oxygen of a rare earth sintered magnet is small. Hence, if mixture slurry in which recycled slurry is added to new slurry is molded in magnetic field and the molded body is sintered, it is possible to obtain a rare earth sintered magnet having a low content of oxygen. Therefore, the producing method of the embodiment can especially preferably be applied as a producing method of a high performance rare earth sintered magnet which requires a low content of oxygen.

Third Embodiment

A third embodiment of a slurry recycling apparatus of the invention used for the slurry recycling method and the producing method of a rare earth sintered magnet of the invention will be described below.

Figure 7:
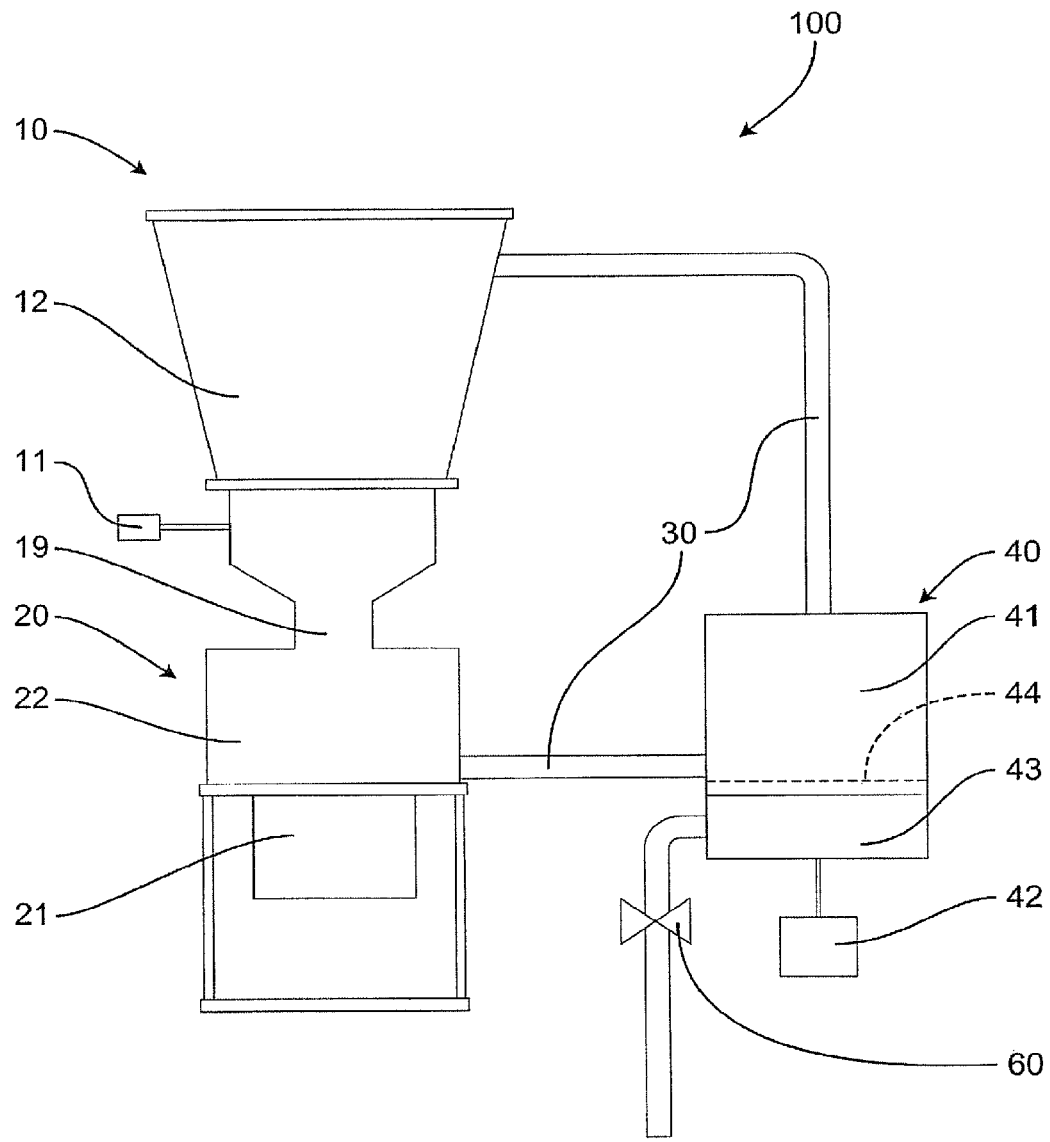
FIG. 7 is a schematic diagram showing a configuration of a slurry recycling apparatus according to a third embodiment of the invention.

FIG. 7 is a schematic diagram showing a structure of a slurry recycling apparatus 100 of the embodiment of the invention. As shown in FIG. 7, the slurry recycling apparatus 100 of the embodiment includes a roughly crushing portion 10, a finely crushing portion 20, a communicating portion 19, a passage 30, a filter portion 40 and a valve 60. These outline structure will be described below based on FIG. 7.

The roughly crushing portion 10 includes a motor 11 and a roughly crushing tank 12. Later-described roughly crushing teeth 14 (see FIG. 8) are rotated by the motor 11 to roughly crush defective molded bodies in the roughly crushing tank 12. An interior of the roughly crushing portion 10 is in communication with an interior of the finely crushing portion 20 through the communicating portion 19 and the passage 30.

The finely crushing portion 20 includes a motor 21 and a finely crushing tank 22. An upper portion of the finely crushing portion 20 is in communication with a lower portion of the roughly crushing portion 10 through the communicating portion 19. By rotating finely crushing teeth 23 (see FIG. 9) by the motor 21 in the horizontal direction, a roughly crushed molded article is crushed, and alloy powder is finely crushed into oil.

A lower portion of the finely crushing portion 20 and an upper portion of the roughly crushing portion 10 are in communication with each other through the passage 30. By rotation of the later-described finely crushing teeth 23, roughly crushed defective molded bodies, alloy powder and oil are circulated between the roughly crushing portion 10 and the finely crushing portion 20.

A filter portion 40 is provided at a halfway portion of the passage 30. The filter portion 40 includes a first filter portion 41, a motor 42 and a second filter portion 43. Hence, defective molded bodies can roughly be crushed and finely crushed in parallel by the roughly crushing portion 10 and the finely crushing portion 20. During this time, if the valve 60 provided below the second filter portion 43 is closed, recycled slurry can be circulated between the roughly crushing portion 10 and the finely crushing portion 20. By this circulation, it is possible to sufficiently crush the defective molded bodies to form recycled slurry dispersed into oil while keeping the same particle diameter as that before alloy powder is wet molded.

After the defective molded bodies are sufficiently crushed, the valve 60 is opened while rotating a rotor 57 (see FIG. 14) in the second filter portion 43 by the motor 42. According to this operation, recycled slurry can be taken out from the filter portion 40.

Next, structures of the roughly crushing portion 10, the finely crushing portion 20 and the filter portion 40 will be described in detail with reference to drawing showing internal structures of these members.

Figure 8:
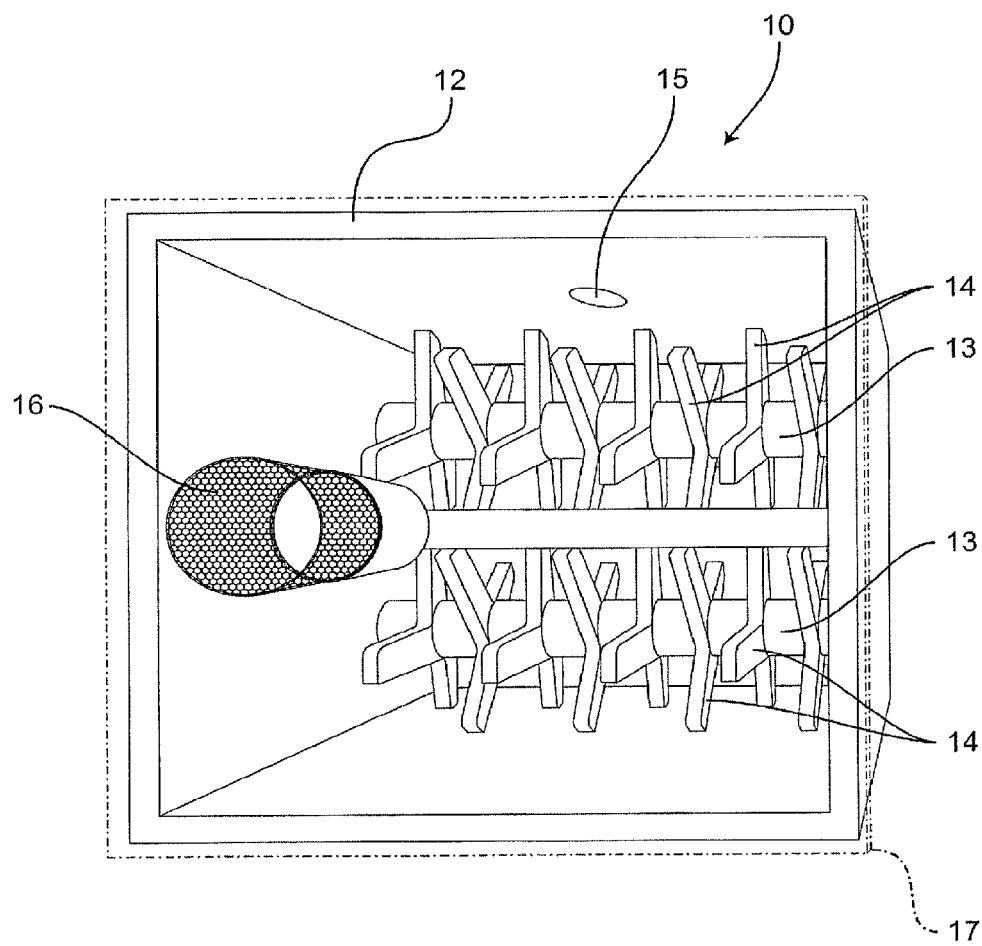
FIG. 8 is a perspective view showing a state of an interior of a roughly crushing portion as viewed from above the slurry recycling apparatus shown in FIG. 7.

FIG. 8 is a schematic diagram of an interior of the roughly crushing portion 10 as viewed from a direction which is an upward direction when the roughly crushing portion 10 is used. As shown in FIG. 8, a lower portion (deep side in FIG. 8) of the roughly crushing tank 12 of the roughly crushing portion 10 includes two roughly crushing shafts 13 which are rotated by the motor 11 (see FIG. 7) such that a rotation shaft is oriented substantially horizontally. The roughly crushing shaft 13 includes a plurality of roughly crushing teeth 14. Defective molded bodies which were put in from an upper portion of the roughly crushing tank 12 (near side in FIG. 8) is first roughly crushed by the roughly crushing shafts 13 and the roughly crushing teeth 14. Hence, the roughly crushing shafts 13 and the roughly crushing teeth 14 prevent the defective molded bodies before they are roughly crushed from moving toward the finely crushing portion 20 below the roughly crushing tank 12.

A lower portion (deep side in FIG. 8) of the roughly crushing teeth 14 of the roughly crushing tank 12 is in communication with an upper portion of the finely crushing tank 22 (see FIG. 7) through the communicating portion 19. The defective molded bodies which were roughly crushed together with oil which was put in together with the defective molded bodies are moved to the finely crushing tank 22 by the roughly crushing teeth 14 by rotations of the roughly crushing shafts 13.

The roughly crushing tank 12 is in communication with a side of the finely crushing teeth 23 of the finely crushing tank 22 through the passage 30 which is in communication with an opening 15 formed in a side surface of the roughly crushing tank 12 at a location higher than the roughly crushing shaft 13 (near side in FIG. 8). Hence, if the finely crushing teeth 23 (see FIG. 9) located below the finely crushing portion 20 rotate, recycled slurry which sometimes includes insufficiently crushed defective molded bodies returns from the opening 15 to the roughly crushing tank 12 through the passage 30. According to this configuration, recycled slurry is circulated between the roughly crushing tank 12 and the finely crushing tank 22. By this circulation, the recycled slurry is repeatedly crushed by the finely crushing teeth 23 until defective molded bodies above the roughly crushing teeth 14 are completely roughly crushed. Therefore, among defective molded bodies which are roughly crushed in the recycled slurry, even if some of them are not sufficiently crushed, it is possible to efficiently and reliably crush the defective molded bodies.

The recycled slurry is circulated through the roughly crushing portion 10, the communicating portion 19, the finely crushing portion 20 and the passage 30. According to this circulation, if the finely crushing teeth 23 below the finely crushing portion 20 are rotated, recycled slurry flows from the lower portion of the finely crushing portion 20 to the passage 30, and a pressure in the finely crushing tank 22 is reduced. There is fear that defective molded bodies in the roughly crushing tank 12 which are not roughly crushed are sucked into the finely crushing tank 22 at a stroke by this pressure reduction, and the communicating portion 19 between the roughly crushing portion 10 and the finely crushing portion 20 is blocked. To prevent such a situation, a conduit 16 through which the upper portion of the roughly crushing teeth 14 and the upper portion of the roughly crushing tank 12 are in communication with each other is formed in the inner surface of the roughly crushing tank 12 at a location higher than the roughly crushing teeth 14. A peripheral wall of the conduit 16 is formed from punching metal in which a plurality of holes are formed in a metal plate, and an oil passage through which fluid such as recycled slurry is made to flow preferentially is formed in the roughly crushing tank 12. By this oil passage, it is possible to prevent defective molded bodies in the roughly crushing tank 12 which are not roughly crushed from being sucked into the finely crushing tank 22 at a stroke through the communicating portion 19. Therefore, it is possible to avoid a case where the communicating portion 19 is blocked and operation efficiency of the crushing step is deteriorated. Hence, by the above-described circulation of recycled slurry, it is possible to roughly crush defective molded bodies by the roughly crushing teeth 14 and to repeatedly crush the already roughly crushed defective molded bodies by the finely crushing teeth 23 of the finely crushing portion 20, and the crushing operations of the defective molded bodies can efficiently be carried out.

The roughly crushing portion 10 includes a lid 17 shown by two-dot chain line at a location above the roughly crushing tank 12. By this lid 17, it is possible to prevent recycled slurry from coming out from the roughly crushing tank 12 or from overflowing.

Figure 9:
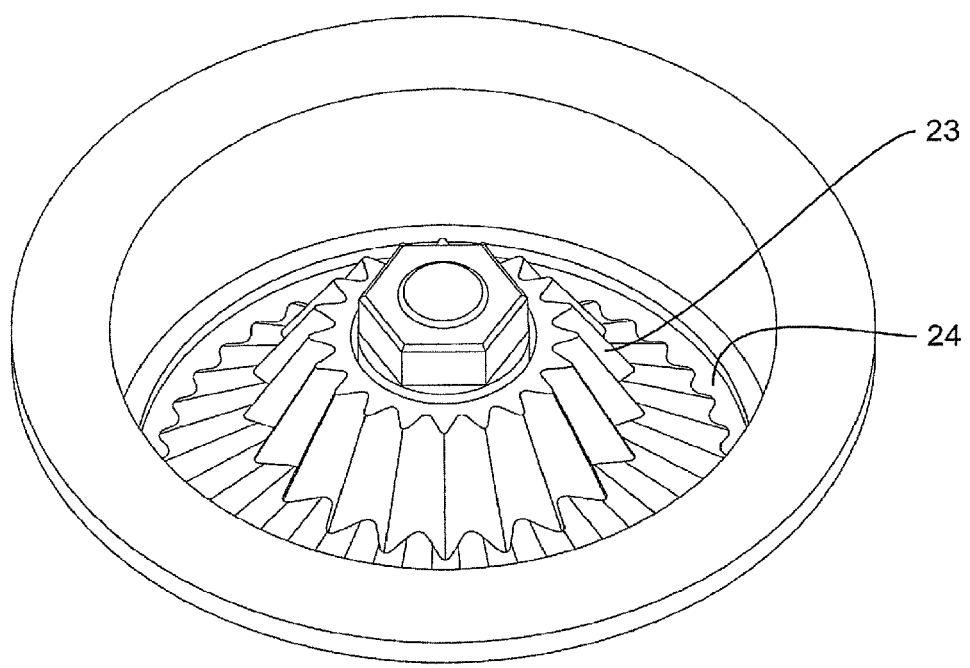
FIG. 9 is a perspective view showing an outline structure of finely crushing teeth in the crushing portion of the slurry recycling apparatus shown in FIG. 7.
Figure 10:
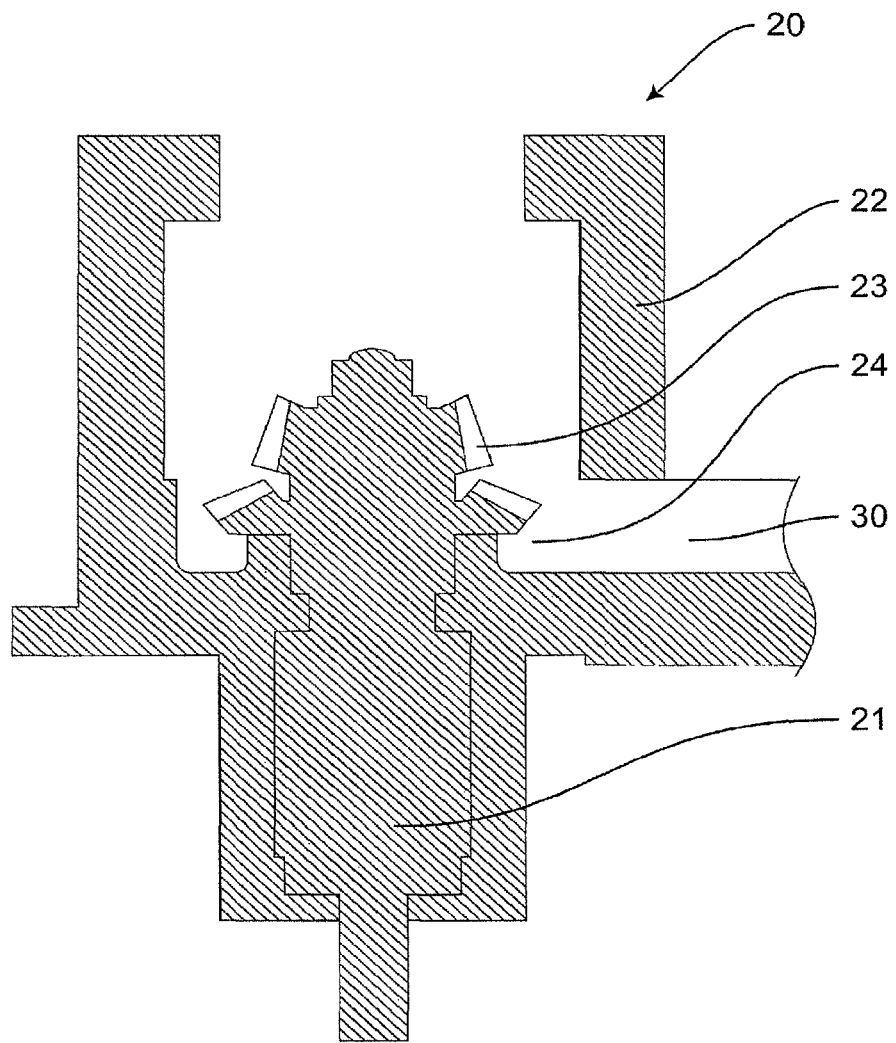
FIG. 10 is a sectional view showing an outline structure of the crushing portion of the slurry recycling apparatus shown in FIG. 7.

Next, an internal structure of the finely crushing portion 20 will be described based on FIGS. 9 and 10. FIG. 9 is a perspective view showing an outline structure of the finely crushing teeth 23 provided in the finely crushing portion 20. As shown in FIG. 9, the finely crushing teeth 23 are provided in the finely crushing tank 22 of the finely crushing portion 20 in the vicinity of a bottom of the finely crushing tank 22. The finely crushing teeth 23 include two kinds of oblique circular cylindrical teeth having different inclination angles, and teeth are formed on side surfaces of the finely crushing teeth 23. The finely crushing teeth 23 are rotated in the lateral direction by the motor 21 (see FIG. 7) such that a rotation axis is oriented substantially vertically. By this rotation, roughly crushed defective molded bodies in oil are crushed, particle diameters thereof are returned to the original particle diameters and they can be dispersed into the oil without pulverizing the alloy powder. A space 24 is formed on a side of the finely crushing teeth 23 of the finely crushing tank 22, and the interior of the finely crushing portion 20 is in communication with the space 24.

Although the two kinds of finely crushing teeth having different inclination angles are used in the embodiment, one kind of finely crushing teeth 23 may be used if the invention can be realized, or three or more kinds of finely crushing teeth may be used. Alternatively, integrally formed finely crushing teeth having a plurality of finely crushing teeth having different inclination angles may be used.

A structure of this portion will be described with reference to FIG. 10 which is a sectional view showing an outline structure of the finely crushing portion 20 of the slurry recycling apparatus 100. As shown in FIG. 10, the space 24 on the side of the finely crushing teeth 23 is in communication with the passage 30. Hence, if the finely crushing teeth 23 rotate in the lateral direction, a flow from the space 24 toward the passage 30 is generated. As a result, recycled slurry is supplied from the opening 15 to the roughly crushing tank 12 through the passage 30 from the space 24 formed on the side of the finely crushing teeth 23 of the finely crushing tank 22, and circulation of the recycled slurry between the roughly crushing tank 12 and the finely crushing tank 22 can be generated.

Figure 11:
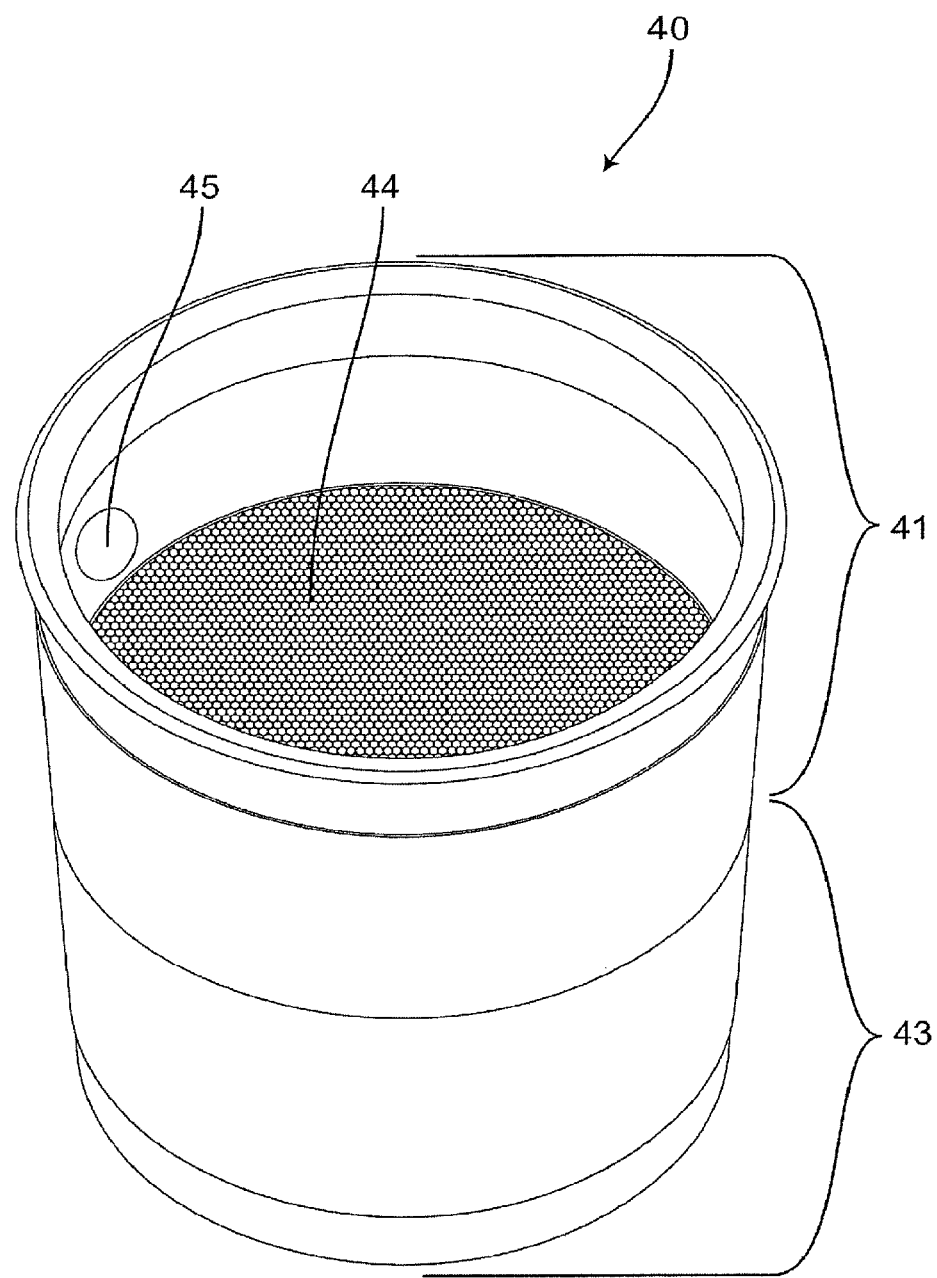
FIG. 11 is a perspective view showing an outline structure of a filter portion of the slurry recycling apparatus shown in FIG. 7.

FIG. 11 is a perspective view showing an outline structure of the filter portion 40. As shown in FIG. 11, the filter portion 40 includes the upper first filter portion 41 and the lower second filter portion 43. The first filter portion 41 and the second filter portion 43 are partitioned from each other through a punching metal 44 provided at a lower portion of the first filter portion 41.

An opening 45 is formed in a side surface of the first filter portion 41, and the passage 30 on the side of the finely crushing tank 22 is in communication with the opening 45. An upper portion of the filter portion 40 is in communication of the passage 30 on the side of the roughly crushing tank 12 (see FIG. 7). As described above, the filter portion 40 is provided at a halfway portion in the passage 30 through which the roughly crushing tank 12 and the finely crushing tank 22 are in communication with each other. Hence, when recycled slurry is circulated between the roughly crushing tank 12 and the finely crushing tank 22 to crush the defective molded bodies, the valve 60 (see FIG. 7) of the taking-out opening provided below the second filter portion 43 of the filter portion 40 should be closed. By closing the valve 60, the recycled slurry passes through a space located above the punching metal 44 in the first filter portion 41 in the circulation between the roughly crushing tank 12 and the finely crushing tank 22.

The defective molded bodies in the recycled slurry are crushed by the circulation and the defective molded bodies are sufficiently dispersed into the oil. After they are sufficiently dispersed, the valve 60 is opened, and the rotor 57 (see FIG. 14) in the second filter portion 43 is rotated. According to this operation, the recycled slurry can be taken out from the slurry recycling apparatus 100. At this time, the recycled slurry passes through the punching metal 44 and the second filter portion 43 of the filter portion 40, and foreign matters are removed. Of foreign matters included in recycled slurry, solid matters greater than the holes of the punching metal 44 are removed by the first filter portion 41. The recycled slurry from which large solid matters are removed moves to the second filter portion 43.

In this embodiment, the filter portion 40 is provided at the halfway portion in the passage 30 through which the roughly crushing tank 12 and the finely crushing tank 22 are in communication with each other. Alternatively, the lower portion of the finely crushing tank 22 may be provided with a passage which is different from the passage 30, the different passage may be provided with the filter portion 40 and the finely crushing tank 22 and the filter portion 40 may be in communication with each other through this passage. If this configuration is employed, valves should be provided at a necessary location of the passage 30 and between the different passage and the filter portion 40, and a flow of recycled slurry should be changed by operating the valves.

There are cases where it is apparent that foreign matters are not mixed to the defective molded bodies at all in some cases, and there are cases where even if foreign matters are mixed, no problem is generated as the recycled slurry. In such cases, recycled slurry may be taken out from the slurry recycling apparatus 100 without letting the recycled slurry pass through the filter portion 40. When the recycled slurry is taken out without letting it pass through the filter portion 40, it is possible to employ a configuration that the lower portion of the finely crushing tank 22 is provided with a passage which is different from the passage 30.

Figure 12:
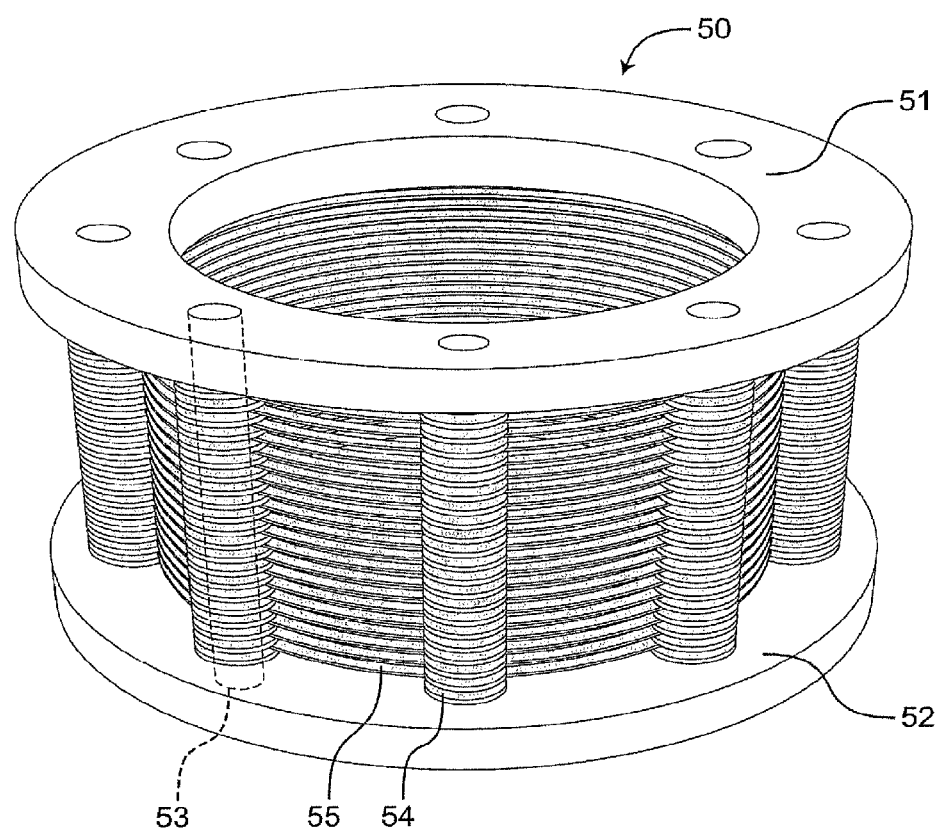
FIG. 12 is a perspective view showing an outline structure of a second filter of a second filter portion of the slurry recycling apparatus shown in FIG. 7.

FIG. 12 is a perspective view showing an outline structure of a second filter (cylindrical filter) 50 provided in the second filter portion 43. As shown in FIG. 12, the second filter 50 is formed by laminating filter disks (annular plates) 55 at predetermined distances from one another by interval disks 54. The interval disks 54 are provided at equal distances from on another around columns 53 between a filter pedestal 51 and a filter pedestal 52.

The second filter 50 is formed by the entire filter disks 55 laminated at the predetermined distances from one another. Gaps are formed in the entire peripheral walls. However, it is not absolutely necessary that the gaps are formed in the entire peripheral walls thereof. If gaps are formed in a portion of the peripheral walls, foreign matters included in recycled slurry can be removed in the gap portion.

Figure 13:
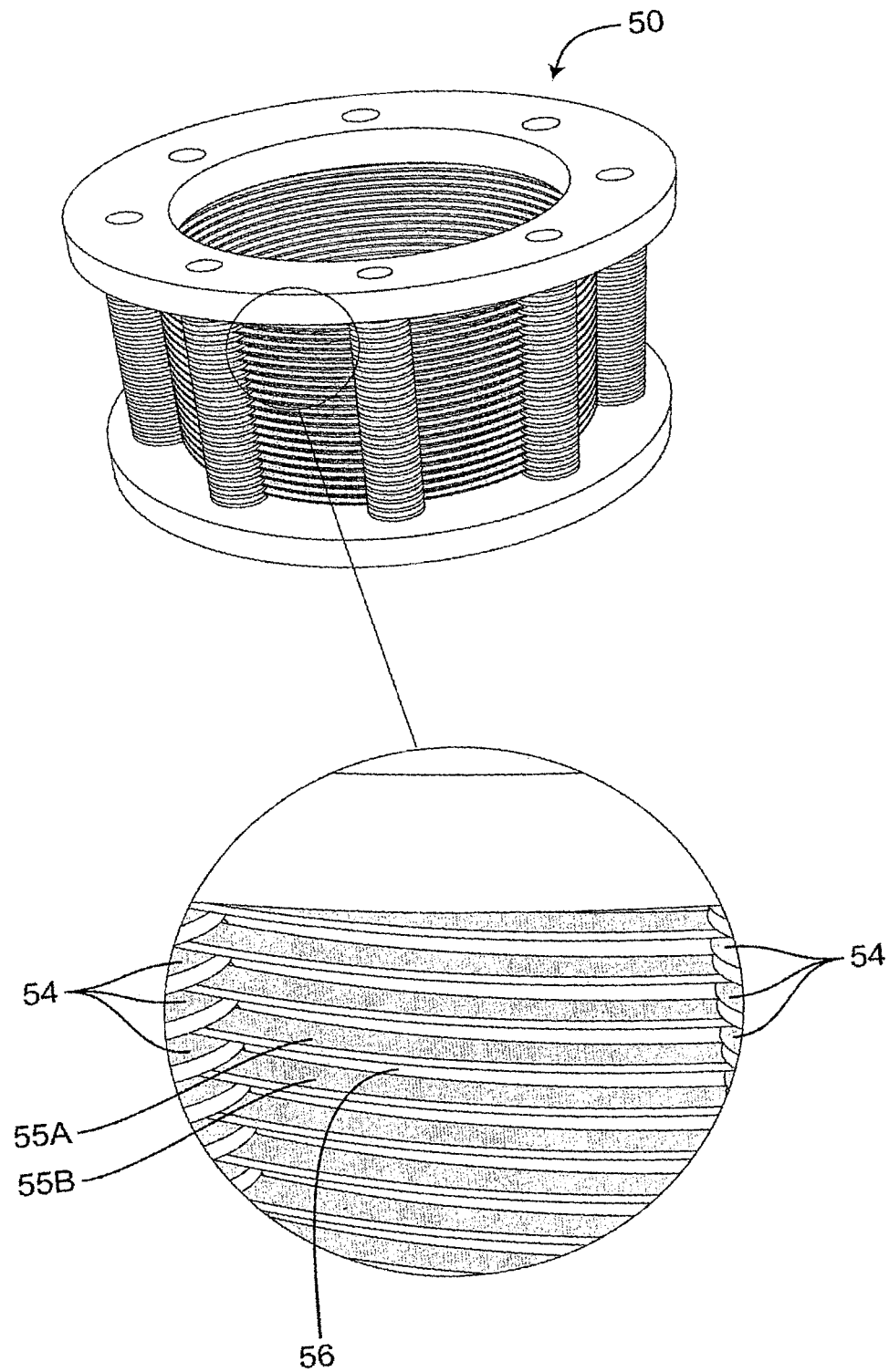
FIG. 13 is a partially enlarged front view for explaining gaps formed between opposed surfaces of filter disks of the second filter.

FIG. 13 is a partially enlarged front view of the second filter 50. Gaps 56 formed between opposed surfaces of adjoining filter disks 55A and 55B of the second filter 50 will be described with reference to FIG. 13. As shown in FIG. 13, the adjoining filter disks 55A and 55B are laminated on each other such that a distance between their opposed surfaces becomes a predetermined distance by the interval disk 54 existing between the filter disks 55A and 55B, and the space between the filter disks 55A and 55B is the gap 56.

Figure 14:
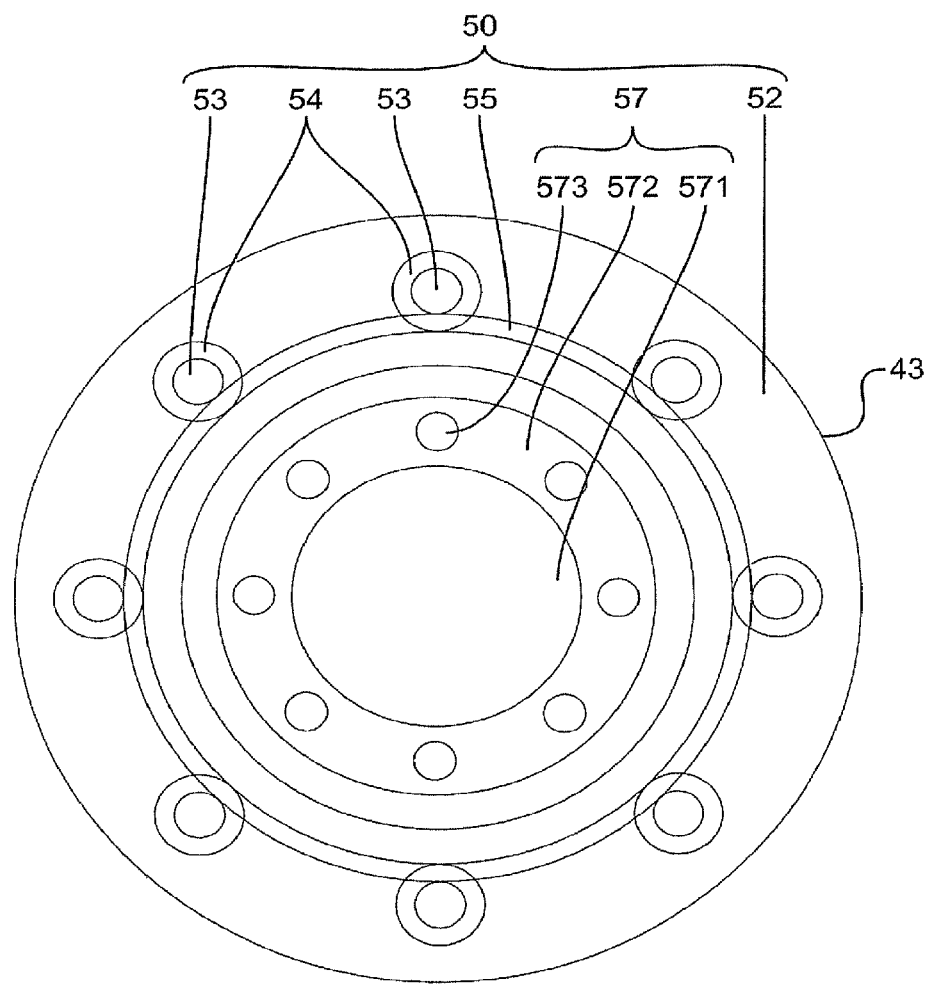
FIG. 14 is an explanatory diagram showing a state in which a pedestal of the second filter is removed to show an outline structure of an interior of the second filter portion of the slurry recycling apparatus shown in FIG. 7.

FIG. 14 is an explanatory diagram showing a state where the filter pedestal 51 of the second filter 50 on the near side in the drawing is removed for explaining an outline configuration in the second filter portion 43. As shown in FIG. 14, in the second filter portion 43, the filter pedestal 52 of the second filter 50 is fitted to the inner surface of the second filter portion 43. A flow of recycled slurry along an inner side wall of the second filter 50 is formed by rotating the rotor 57 in the second filter 50 by the motor 42 (see FIG. 7), recycled slurry is discharged out from the second filter 50 from the gap 56 by a centrifugal force, and the recycled slurry is filtered. By this filtering operation, foreign matters such as metal flakes remain in the second filter 50, and foreign matters are removed from the recycled slurry. A known rotor capable of generating the above-described flow of recycled slurry and the centrifugal force may be used as the rotor 57.

Figure 15:
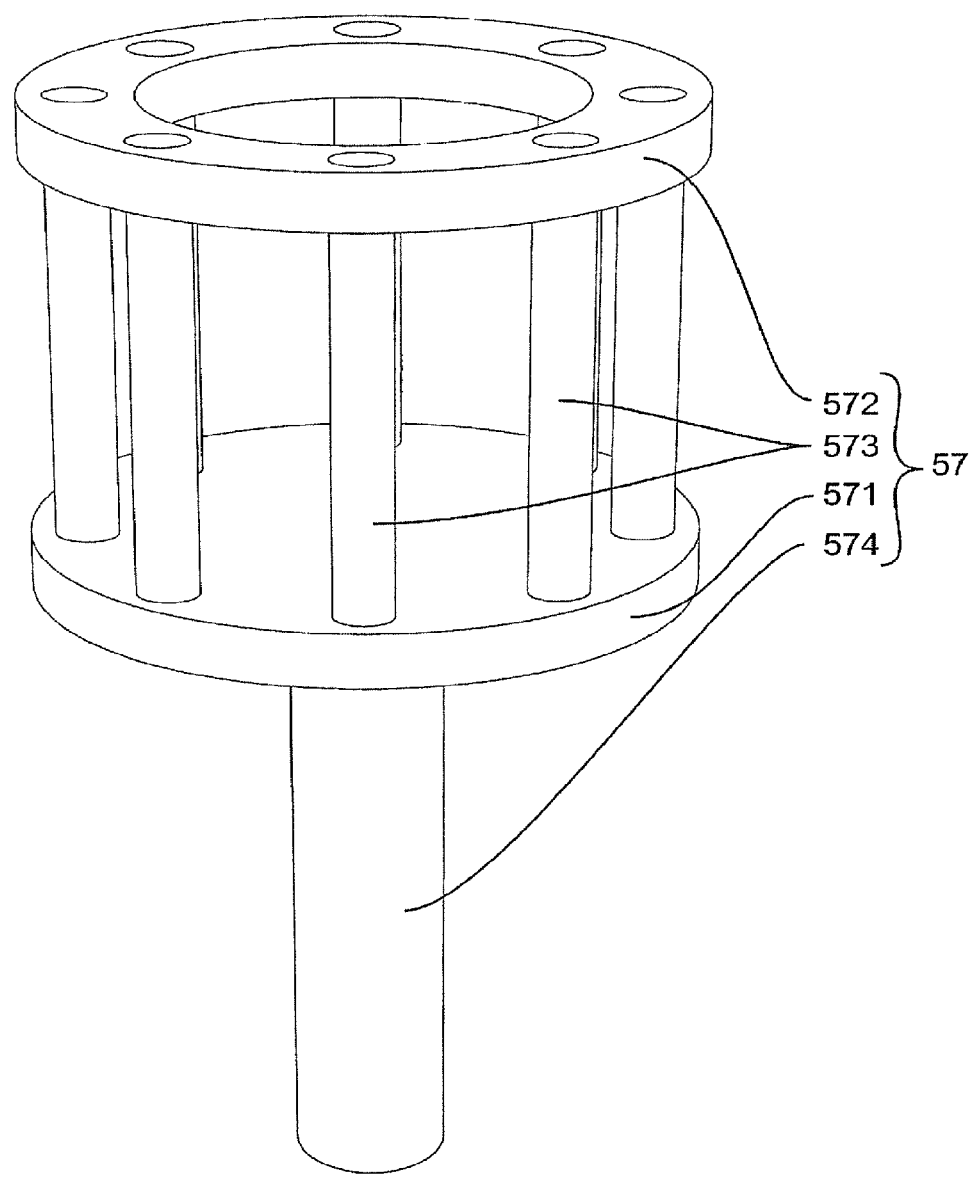
FIG. 15 is a perspective view of a rotor in the filter portion shown in FIG. 14.
Figure 16:
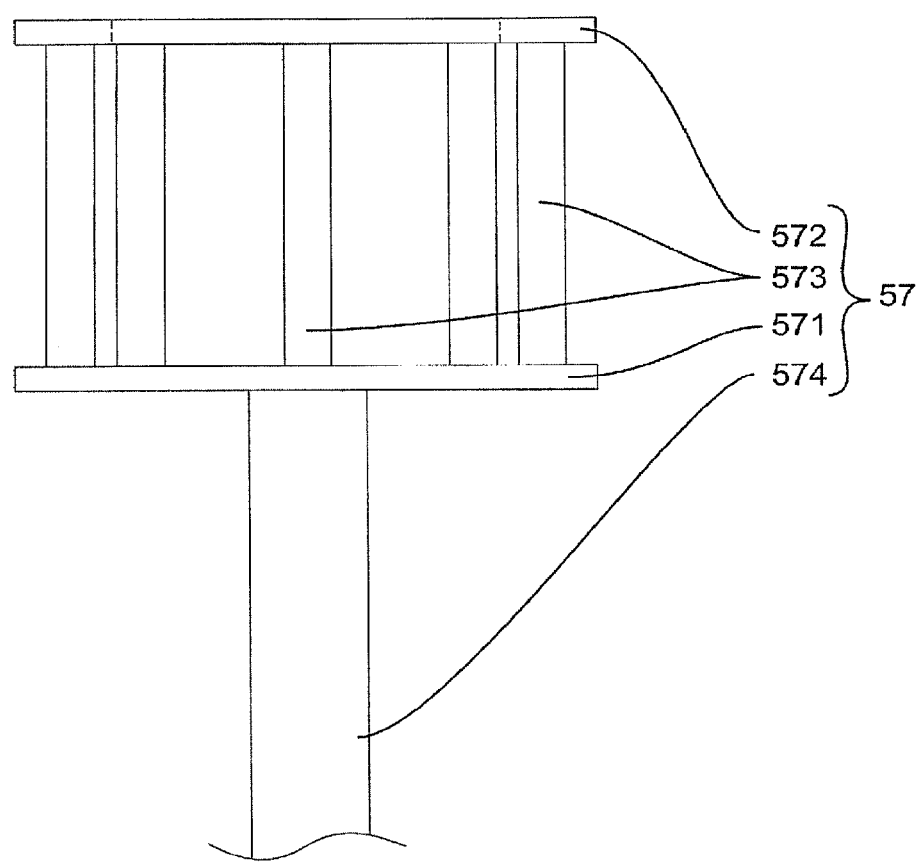
FIG. 16 is a side view of the rotor in the filter portion shown in FIG. 14.

FIGS. 15 and 16 are a perspective view and a side view showing a structure of the rotor 57 which is schematically shown in FIG. 14. As shown in FIGS. 15 and 16, the rotor 57 includes a circular plate 571, an annular flat plate 572 and a plurality of circular cylinders 573. The circular plate 571 is located on the side of the filter pedestal 52 (see FIG. 12) of the second filter 50. A center of a disk surface of the circular plate 571 on the side of the filter pedestal 52 is connected to the motor 42 through a rotation shaft 574. The annular flat plate 572 is substantially in parallel to the circular plate 571, and is located on the side of the filter pedestal 51 of the second filter 50. The plurality of circular cylinders 573 are provided between the circular plate 571 and the annular flat plate 572. The plurality of circular cylinders 573 are provided at equal distances from each other in the vicinity of outer peripheral surfaces of the circular plate 571 and the annular flat plate 572. One ends of the circular cylinders 573 are bonded to a surface of the circular plate 571, and the other ends thereof are bonded to a surface of the annular flat plate 572.

The rotor 57 is formed from the circular plate 571, the plurality of circular cylinders 573 and the annular flat plate 572. By rotating the rotation shaft 574 by the motor 42 to rotate the center of the circular plate 571, a flow of recycled slurry is formed along the inner wall of the second filter 50, and a force is generated by a centrifugal force to push the recycled slurry in the second filter 50 from inward to outward of the rotor 57.

Figure 17:
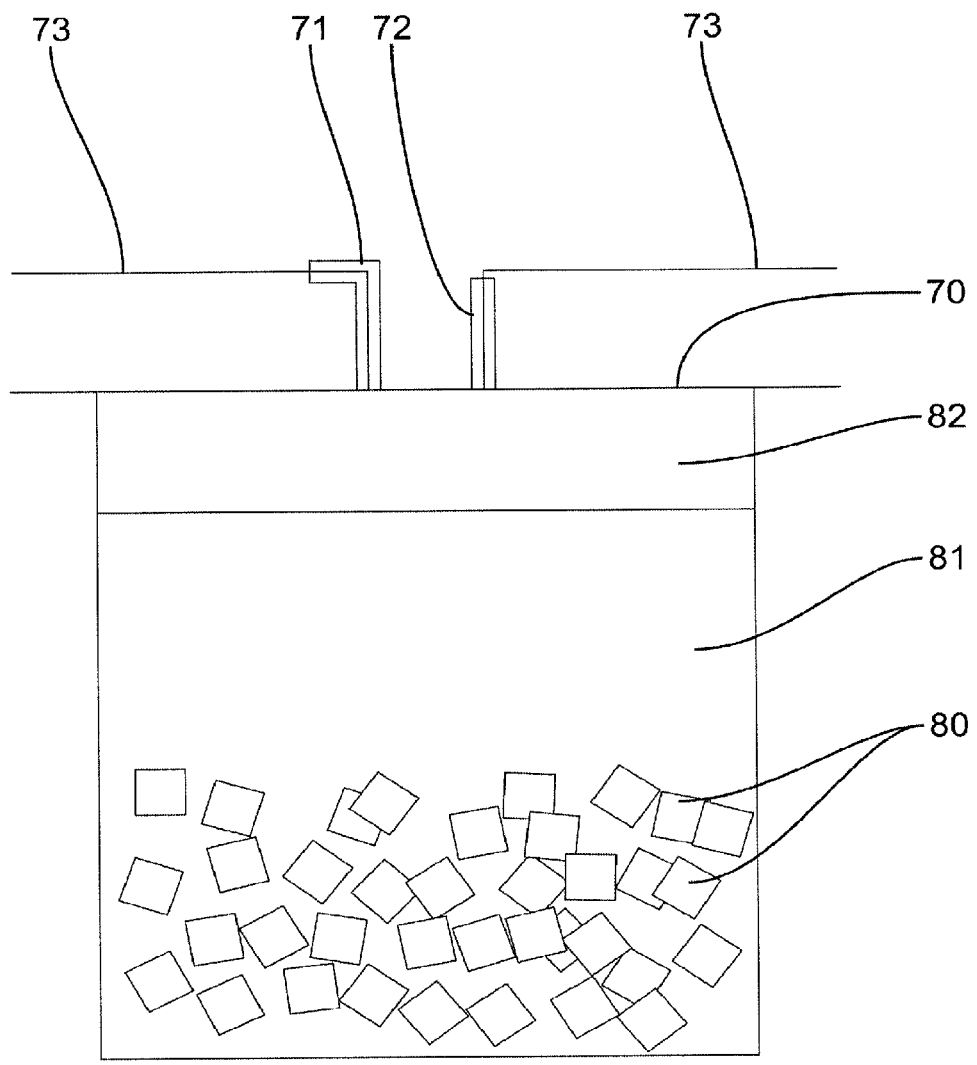
FIG. 17 is a schematic diagram showing a state where defective molded bodies are stored in oil.

A storing method of defective molded bodies used as raw materials of recycled slurry will be described below based on FIG. 17. FIG. 17 is a schematic diagram showing a state where defective molded bodies are stored in oil. As shown in FIG. 17, defective molded bodies 80 are stored in the storage container 70 such that they are immersed in oil 81. A space 82 in the storage container 70 which is not filled with oil 81 is nitrogen atmosphere into which nitrogen is charged. According to this configuration, it is possible to prevent a case where oxidization of defective molded bodies 80 proceeds by reaction between oil 81 and dissolved oxygen.

As shown in FIG. 17, nitrogen introduced from a nitrogen introducing opening 71 of the storage container 70 passes through the space 82 and then, the nitrogen is discharged from a nitrogen discharging opening 72, and it is supplied to a connection pipe 73. FIG. 17 shows a storing state of one of the plurality of storage containers 70 which can be connected to each other through a connection pipe 73. By connecting the spaces 82 to each other through the connection pipe 73, the spaces 82 of the plurality of storage containers 70 can be brought into nitrogen atmosphere. A can-container can be used as the storage container 70.

Figure 18:
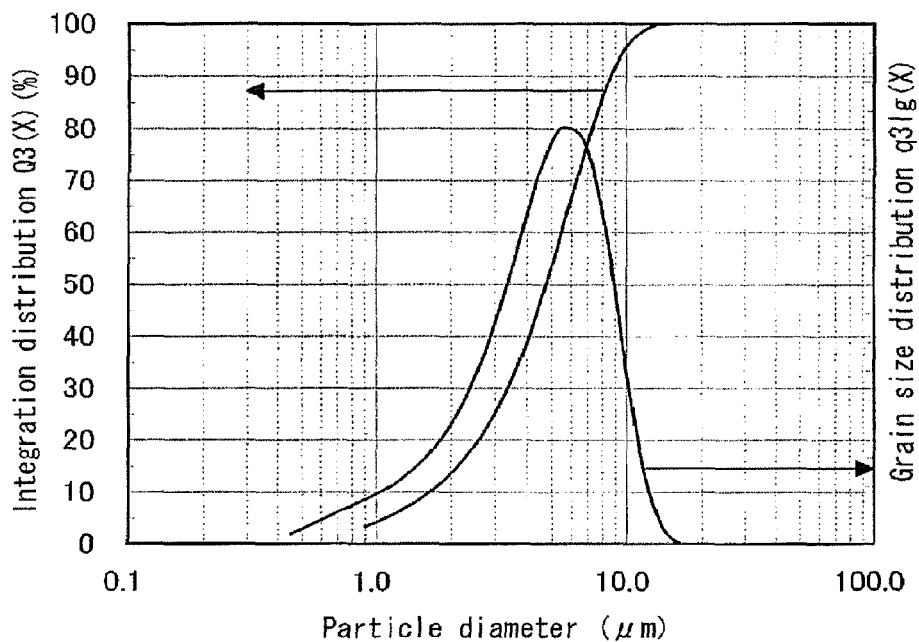
FIG. 18 is a graph showing a result of measurement of a grain size distribution of recycled slurry obtained by finely crushing defective molded bodies using the slurry recycling apparatus according to the embodiments.

A measuring method of particle diameters of recycled slurry and new slurry will be described based on FIG. 18. FIG. 18 shows an example of a grain size distribution of recycled slurry measured by an apparatus (name of product: Sympatec HELOS (H9242)) which is pursuant to ISO13320-1. The grain size distribution is measured by the above-described apparatus, volumes are integrated from smaller particle diameter grain, 10% of entire volume is represented by particle diameter (D10), 50% of entire volume is represented by particle diameter (D50), and 90% of entire volume is represented by particle diameter (D90).

In FIG. 18, it can be found that particle diameters of recycled slurry are D10=1.63 μm, D50=4.76 μm and D90=8.71 μm.

EXAMPLES

First Example

As a starting raw material, predetermined amounts of electrolytic iron, ferroboron and metal Nd were mixed such that they became the same compositions, they were melted and casted in a high frequency smelting furnace, and five raw material alloys (ingots) were produced. The ingots were roughly pulverized, and finely pulverized by a jet mill in nitrogen in which oxygen amount were 10 ppm. The obtained finely pulverized powder was immersed in mineral oil (produced by IDEMITSU, trade name: MC OIL P-02) in nitrogen atmosphere at fractional distillation point of 200° C. to 300° C. having kinematic viscosity of 2 cSt at room temperature, and slurry (new slurry) was obtained.

The obtained five new slurry was formed by the press machine shown in FIG. 6, and molded bodies were obtained. Based on the obtained molded bodies, recycled slurry was formed using the slurry recycling apparatus described in the second embodiment of the invention for each of samples.

A grain size distribution of the five samples of new slurry was measured, and D10, D50 and D90 were obtained.

A grain size distribution of the five samples of recycled slurry was measured, and D10, D50 and D90 were obtained.

New slurry and recycled slurry were wet molded for each of the samples using the press machine shown in FIG. 6. That is, new slurry and recycled slurry were charged into the cavity of the mold cavity 101, current was made to flow through the orientation magnetic field coil 106, alloy powder in the mineral oil was oriented with orientation magnetic field strength of 15 kOe, and it was pressurized by the upper punch 105 while keeping this state. Most of the mineral oil included in the pressurized new slurry and recycled slurry was discharged from the solvent discharging holes 103 formed in the upper punch 105 through the filter cloth 104.

Thereafter, the orientation magnetic field current was cut off, the molded body was taken out and it was immediately immersed in the mineral oil. The obtained molded body was taken out from the mineral oil, it was inserted into a sintering furnace, a temperature was increased from a room temperature to 150° C. at 1.56° C./min under pressure of $5 \times 10^{-2}$ Torr, it was held for one hour at this temperature, the temperature was increased to 500° C. at 1.5° C./min, mineral oil in the molded body was removed, the temperature was increased from 500° C. to 1,100° C. at 20° C./min under pressure of $5 \times 10^{-1}$ Torr, it was held for two hours, and then it was cooled in the furnace. The obtained sintered body was subjected to thermal processing at 900° C. for one hour, and at 600° C. for one hour, and an oxygen amount, a carbon amount and magnet properties of the sintered body were measured. Results thereof are shown in Table 1. Numbers in Table 1 respectively represent numbers of samples. Particle diameters were measured by the method shown in FIG. 18

TABLE 1

|  |  | D10 (μm) | D50 (μm) | D90 (μm) | O (ppm) | C (wt. %) | Saturation flux density (T) | coercive force kA/m |
|---|---|---|---|---|---|---|---|---|
| Recycled slurry | 1 | 1.43 | 4.59 | 8.09 | 1950 | 0.096 | 1.35 | 1718 |
|  | 2 | 1.42 | 4.68 | 8.21 | 1510 | 0.093 | 1.35 | 1886 |
|  | 3 | 1.32 | 4.55 | 8.10 | 1590 | 0.095 | 1.34 | 1893 |
|  | 4 | 1.36 | 4.66 | 8.20 | 1960 | 0.087 | 1.34 | 1838 |
|  | 5 | 1.47 | 4.68 | 8.34 | 1650 | 0.083 | 1.34 | 1806 |
| New slurry | 1 | 1.37 | 4.6 | 8.03 | 1110 | 0.092 | 1.34 | 1902 |
|  | 2 | 1.38 | 4.67 | 8.15 | 1080 | 0.096 | 1.34 | 1918 |
|  | 3 | 1.36 | 4.64 | 8.10 | 1240 | 0.093 | 1.33 | 1902 |
|  | 4 | 1.4 | 4.66 | 8.16 | 1310 | 0.098 | 1.33 | 1846 |
|  | 5 | 1.38 | 4.64 | 8.08 | 1180 | 0.095 | 1.34 | 1950 |

Nos. of new slurry and Nos. of recycled slurry are respectively correspond to each other, recycled slurry formed using molded body using new slurry No. 1 is No. 1, and recycled slurry formed using molded body using new slurry No. 2 is No. 2.

As apparent from Table 1, if new slurry and recycled slurry are compared with each other, it can be found that values of D10, D50 and D90 are not changed almost at all. That is, particle diameters are not changed almost at all before and after the crushing step.

If new slurry and recycled slurry are compared with each other, although the oxygen amount of the recycled slurry was increased by about 500 ppm as compared with the new slurry, the carbon amount was not changed almost at all.

The saturation flux density was not changed almost at all between the recycled slurry and the new slurry. The coercive force of the recycled slurry was slightly lowered as compared with that of the new slurry, it could be confirmed that even if only the recycled slurry was used, a rare earth sintered magnet of such a level that it could be provided as a product could be produced.

Second Example

By the same method as that of the first example, 10 samples of new slurry were formed.

Each of the samples was crushed using the slurry recycling apparatus of the second embodiment, and 10 samples of recycled slurry were formed.

Five samples were extracted from the new slurry at random, five samples were extracted from the recycled slurry at random, 10% by mass recycled slurry was mixed into 90% by mass new slurry, and mixture slurry was formed. A particle diameter of the formed mixing step was measured, molded bodies which were wet molded in magnetic field were sintered, they were subjected to thermal processing, and sintered magnets were formed.

TABLE 2

|  |  | D10 (μm) | D50 (μm) | D90 (μm) | O (ppm) | C (wt. %) | Saturation flux density (T) | coercive force kA/m |
|---|---|---|---|---|---|---|---|---|
| Mixture slurry | 1 | 1.40 | 4.70 | 8.24 | 1130 | 0.095 | 1.34 | 1902 |
|  | 2 | 1.41 | 4.68 | 8.20 | 1350 | 0.095 | 1.35 | 1932 |
|  | 3 | 1.39 | 4.52 | 8.13 | 1400 | 0.096 | 1.34 | 1926 |
|  | 4 | 1.34 | 4.72 | 8.32 | 1220 | 0.087 | 1.33 | 1950 |
|  | 5 | 1.53 | 4.78 | 8.53 | 1330 | 0.085 | 1.34 | 1910 |

Table 2 shows particle diameters of the samples, an oxygen amount, a carbon amount, saturation flux density and coercive force of each of the obtained sintered magnets. The particle diameters were measured by the method shown in FIG. 18.

As apparent from Table 2, the particle diameters of the mixture slurry were not changed almost at all between the samples. The oxygen amount, the carbon amount and the magnet properties of the sintered magnets were almost the same between the samples. From these results, it could be found that according to the slurry recycling apparatus of the invention, recycled slurry having stable quality could be formed.

INDUSTRIAL APPLICABILITY

According to the present invention, since defective molded bodies of a rare earth sintered magnet can be recycle without through the pulverizing step, a cost required for recycling can be reduced as compared with the conventional technique, and it is possible to use the invention for producing a high performance rare earth sintered magnet having a small contained amount of oxygen.

EXPLANATION OF SYMBOLS

11 roughly crushing portion
12 roughly crushing tank
13 roughly crushing shaft
14 roughly crushing teeth
16 conduit
19 communicating portion
20 finely crushing portion
22 finely crushing tank
23 finely crushing teeth
30 passage
40 filter portion
41 first filter portion
43 second filter portion
44 punching metal (first filter)
45 opening
50 second filter (cylindrical filter)
55 filter disks
56 gap
57 rotor
100 slurry recycling apparatus

The invention claimed is:

1. A slurry recycling apparatus in which a molded body obtained by wet molding, in magnetic field, slurry formed of alloy powder for a rare earth sintered magnet and mineral oil and/or synthetic fluid is crushed in mineral oil and/or synthetic fluid to recycle the molded body into slurry, wherein
the slurry recycling apparatus includes a roughly crushing tank including roughly crushing teeth which roughly crush the molded body, and
a finely crushing tank including finely crushing teeth which finely crush the roughly crushed molded body, and
a lower portion of the roughly crushing tank and an upper portion of the finely crushing tank are in communication with each other,
further comprising a passage, wherein the finely crushing tank and a portion in the roughly crushing tank which is higher than the roughly crushing teeth are in communication with each other through the passage.

2. A slurry recycling apparatus according to claim 1, wherein a particle diameter of the alloy powder for a rare earth sintered magnet in the molded body before it is crushed and a particle diameter of the alloy powder for a rare earth sintered magnet in the slurry after it is crushed are the same.

3. The slurry recycling apparatus according to claim 1, further comprising a filter portion provided in a halfway portion in the passage.

4. The slurry recycling apparatus according to claim 3, wherein the filter portion includes a cylindrical filter in which annular plates are laminated on each other such that a gap is formed between opposed surfaces of the annular plates.

5. The slurry recycling apparatus according to claim 3, wherein the filter portion includes a first filter and a second filter, and
fine foreign matters which pass through the first filter are removed by the second filter.

6. The slurry recycling apparatus according to claim 5, wherein the first filter is a plate-like punching metal in which a plurality of holes are formed, and
the second filter is a cylindrical filter in which annular plates are laminated on each other such that a gap is formed between opposed surfaces of the annular plates.

7. The slurry recycling apparatus according to claim 1, further comprising a conduit, wherein an upper portion of the roughly crushing teeth in the roughly crushing tank and an upper portion of the roughly crushing tank are in communication with each other through the conduit.

8. The slurry recycling apparatus according to claim 7, wherein a peripheral wall of the conduit is formed from a punching metal in which a plurality of holes are formed.

* * * * *